(12) United States Patent
Creighton et al.

(10) Patent No.: US 7,305,923 B2
(45) Date of Patent: Dec. 11, 2007

(54) UNIVERSAL BOXCAR WITH EXTERIOR METAL SURFACES

(75) Inventors: George S. Creighton, Flower Mound, TX (US); Robert J. Barry, Arlington, TX (US); D. Bruce Fetterman, Arlington, TX (US)

(73) Assignee: Trinity Industries, Inc., Dallas, TX (US)

( * ) Notice: Subject to any disclaimer, the term of this patent is extended or adjusted under 35 U.S.C. 154(b) by 156 days.

(21) Appl. No.: 10/960,243

(22) Filed: Oct. 7, 2004

(65) Prior Publication Data

US 2005/0087096 A1  Apr. 28, 2005

Related U.S. Application Data

(60) Provisional application No. 60/509,935, filed on Oct. 9, 2003.

(51) Int. Cl.
    *B61D 17/00* (2006.01)
(52) U.S. Cl. .................. 105/404; 410/101; 410/116; 105/355
(58) Field of Classification Search ............. 105/396, 105/423, 422, 404, 409, 410, 413, 355; 220/1.5, 220/592.2; 52/404.1; 296/180.3, 191, 197, 296/183, 187, 188; 410/101, 102, 104, 105, 410/106, 109, 110, 113, 115, 116
See application file for complete search history.

(56) References Cited

U.S. PATENT DOCUMENTS 215,625 A    5/1879  Jauriet .................. 62/423
1,085,058 A  1/1914  Messick
1,092,659 A  4/1914  Mettler
1,212,043 A  1/1917  Freeman et al.
1,284,111 A  11/1918 Kestler
1,330,361 A  2/1920  Todd
1,494,579 A  5/1924  Bohn ................... 49/489.1
1,801,564 A  4/1931  Muffly ................. 220/592.07
2,011,155 A  8/1935  Neikirk ................ 105/415
2,047,133 A  7/1936  Christianson et al. ..... 105/409

(Continued)

FOREIGN PATENT DOCUMENTS

GB        J07564 A     0/1910

OTHER PUBLICATIONS

"IRECO Boxcar Lading Tie Anchor" at http://www/ireco.com/BoxcarLadingAnchors2761_3648.htm, 2 pgs, Printed Dec. 15, 2003.

(Continued)

*Primary Examiner*—Mark T. Le
(74) *Attorney, Agent, or Firm*—Baker Botts L.L.P.

(57) ABSTRACT

A universal boxcar is provided with exterior metal surfaces and load carrying capabilities of a conventional uninsulated boxcar and thermal transfer ratings of an insulated boxcar. The boxcar may be formed with interior dimensions corresponding generally with interior dimensions of an uninsulated boxcar without high cost, high performance insulation. The boxcar may include a double side doors slidably mounted on the exterior of each sidewall assemble. A load restraint system may be provided with improved load carrying capabilities and performance characteristics. The load restraint system may have increased load carrying capacity, increased service life, and reduced maintenance costs. All or portions of the load restraint system may be used in uninsulated boxcars or temperature controlled railway cars.

13 Claims, 14 Drawing Sheets

U.S. PATENT DOCUMENTS

| | | | | |
|---|---|---|---|---|
| 2,169,692 | A | 8/1939 | Hansen | |
| 2,269,631 | A | 1/1942 | Marinello | 105/377.09 |
| 2,605,064 | A | 7/1952 | Davis | 244/118 |
| 2,716,383 | A * | 8/1955 | Johnson | 410/112 |
| 2,756,693 | A | 7/1956 | Frost | 105/369 |
| 2,888,883 | A | 6/1959 | Fritz et al. | 105/250 |
| 3,137,247 | A | 6/1964 | Hamilton et al. | 105/251 |
| 3,179,068 | A | 4/1965 | Jensen | 105/369 |
| 3,288,531 | A | 11/1966 | Bartsch | |
| 3,343,725 | A | 9/1967 | Cannon | 122/129 |
| 3,408,956 | A | 11/1968 | Rebenok et al. | 105/240 |
| 3,434,433 | A | 3/1969 | Floehr | 105/249 |
| 3,455,253 | A | 7/1969 | Floehr | 105/251 |
| 3,468,062 | A | 9/1969 | Hennessy | 49/362 |
| 3,468,063 | A | 9/1969 | Hennessy | 49/362 |
| 3,501,030 | A | 3/1970 | Flink | 214/17 |
| 3,581,672 | A | 6/1971 | Aquino | 105/240 |
| 3,601,453 | A | 8/1971 | Silverman | 303/89 |
| 3,624,761 | A | 11/1971 | Kohn | 180/112 |
| 3,626,865 | A | 12/1971 | Aquino et al. | 105/240 |
| 3,636,658 | A | 1/1972 | Bollinger, Sr. | 49/362 |
| 3,656,437 | A | 4/1972 | Kuzmicki | 105/240 |
| 3,683,552 | A | 8/1972 | Bollinger, Sr. | 49/209 |
| 3,746,388 | A | 7/1973 | Robinson | 296/181.6 |
| 3,762,341 | A | 10/1973 | Adler | 410/103 |
| 3,789,772 | A | 2/1974 | Bullard | 105/240 |
| 3,796,007 | A | 3/1974 | Bollinger, Sr. et al. | 49/362 |
| 3,800,711 | A | 4/1974 | Tuttle | 105/251 |
| 3,802,356 | A | 4/1974 | Hasselof et al. | 105/376 |
| 3,837,296 | A | 9/1974 | Loomis | 105/376 |
| 3,843,081 | A | 10/1974 | Meier et al. | 248/223 |
| 3,883,992 | A | 5/1975 | Bollinger, Sr. | 49/362 |
| 3,917,338 | A | 11/1975 | Becker | 410/116 |
| 3,923,327 | A | 12/1975 | Ross, Jr. | 292/39 |
| 3,949,681 | A | 4/1976 | Miller | 105/284 |
| 3,965,760 | A | 6/1976 | Etheredge, Jr. | 74/89.14 |
| 3,990,184 | A | 11/1976 | Bollinger, Sr. | 49/218 |
| 3,996,591 | A | 12/1976 | Hayward | 343/225 |
| 4,021,066 | A | 5/1977 | McShane | 292/144 |
| 4,114,318 | A | 9/1978 | Brindle | 49/215 |
| 4,136,621 | A | 1/1979 | Schuller et al. | 105/308 |
| 4,138,948 | A | 2/1979 | Korolis | 105/251 |
| 4,145,080 | A | 3/1979 | Miller et al. | 296/24.35 |
| 4,167,144 | A | 9/1979 | Martin et al. | 105/467 |
| 4,168,667 | A | 9/1979 | Loomis | 105/467 |
| 4,227,732 | A | 10/1980 | Kish | 294/71 |
| 4,235,169 | A | 11/1980 | Peterson | 105/251 |
| 4,246,849 | A | 1/1981 | Gramse | 105/251 |
| 4,250,814 | A | 2/1981 | Stark et al. | 105/251 |
| 4,262,601 | A | 4/1981 | Miller | 105/241.2 |
| 4,342,267 | A | 8/1982 | Blout | 105/282 |
| 4,400,914 | A | 8/1983 | Hennessy | 49/362 |
| 4,417,526 | A * | 11/1983 | Marulic et al. | 105/406.1 |
| 4,450,773 | A | 5/1984 | Fritz et al. | 105/282 |
| 4,491,354 | A | 1/1985 | Williams | 292/148 |
| 4,580,502 | A | 4/1986 | Ritzl et al. | 105/240 |
| 4,601,244 | A | 7/1986 | Fischer | 105/240 |
| 4,766,820 | A | 8/1988 | Ritter et al. | 105/240 |
| 4,829,908 | A | 5/1989 | Hallam | 105/240 |
| 4,930,427 | A | 6/1990 | Ritter et al. | 105/406.1 |
| 4,986,590 | A * | 1/1991 | Patti et al. | 296/39.2 |
| 5,077,459 | A | 12/1991 | Heumiller | 219/117.1 |
| 5,115,748 | A | 5/1992 | Westlake | 105/286 |
| 5,144,895 | A | 9/1992 | Murray | 105/286 |
| 5,163,372 | A | 11/1992 | Galvan et al. | 105/240 |
| 5,177,988 | A | 1/1993 | Bushnell | 70/279 |
| 5,261,333 | A | 11/1993 | Miller | 105/287 |
| 5,263,422 | A | 11/1993 | Barefoot | 105/308.1 |
| 5,351,582 | A | 10/1994 | Snyder et al. | 81/57.17 |
| 5,562,989 | A * | 10/1996 | Statz | 428/402 |
| 5,713,974 | A | 2/1998 | Marin et al. | 62/17.2 |
| 5,765,485 | A * | 6/1998 | Thoman et al. | 105/404 |
| 5,802,984 | A | 9/1998 | Thoman et al. | 105/404 |
| 5,868,045 | A | 2/1999 | Hauk | 81/57.34 |
| 5,890,435 | A | 4/1999 | Thoman et al. | 105/404 |
| 6,019,049 | A | 2/2000 | Gaydos et al. | 105/289 |
| 6,092,472 | A | 7/2000 | Thoman et al. | 105/404 |
| 6,109,844 | A | 8/2000 | Nadherny et al. | 410/34 |
| 6,112,671 | A | 9/2000 | Basile et al. | 105/422 |
| 6,116,118 | A | 9/2000 | Wesch, Jr. | 81/57.34 |
| 6,138,529 | A | 10/2000 | Pietras | 81/57.33 |
| 6,138,580 | A * | 10/2000 | Thoman | 105/396 |
| 6,186,563 | B1 | 2/2001 | Kruzick et al. | 292/201 |
| 6,270,600 | B1 | 8/2001 | Wycech | 156/79 |
| 6,279,487 | B1 | 8/2001 | Gaydos et al. | 105/289 |
| 6,315,509 | B1 | 11/2001 | Nadherny et al. | 410/116 |
| 6,367,391 | B1 * | 4/2002 | Thoman et al. | 105/404 |
| 6,374,546 | B1 | 4/2002 | Fecko et al. | 52/17 |
| 6,402,446 | B1 | 6/2002 | Nadherny et al. | 410/100 |
| 6,422,794 | B1 | 7/2002 | Zhan et al. | 410/100 |
| 6,450,105 | B1 | 9/2002 | Glass | 105/404 |
| 6,481,941 | B2 * | 11/2002 | Nadherny et al. | 410/114 |
| 6,494,651 | B1 | 12/2002 | Zhan et al. | 410/116 |
| 6,575,102 | B2 * | 6/2003 | Norton et al. | 105/423 |
| 6,585,466 | B2 | 7/2003 | Zhan et al. | 410/116 |
| 6,609,583 | B2 | 8/2003 | Schillaci et al. | 180/69.21 |
| 6,615,741 | B2 | 9/2003 | Fecko et al. | 105/404 |
| 6,626,623 | B2 | 9/2003 | DeLay | 410/116 |
| 6,655,886 | B2 | 12/2003 | Grandy | 410/112 |
| 6,709,209 | B2 | 3/2004 | Zhan et al. | 410/116 |
| 6,712,568 | B2 | 3/2004 | Snyder et al. | 410/104 |
| 6,722,287 | B2 | 4/2004 | Norton et al. | 105/404 |
| 6,748,841 | B1 | 6/2004 | Fritz | 87/57.41 |
| 6,761,840 | B2 | 7/2004 | Fecko et al. | 52/17 |
| 2002/0046678 | A1 | 4/2002 | Fecko et al. | 105/404 |
| 2002/0148381 | A1 | 10/2002 | Norton et al. | 105/355 |
| 2002/0157565 | A1 | 10/2002 | Norton et al. | 105/404 |
| 2002/0170238 | A1 | 11/2002 | Fecko et al. | 52/17 |
| 2006/0065152 | A1 | 3/2006 | Heitmeyer et al. | 105/404 |

OTHER PUBLICATIONS

"What is Vacuum Insulation? Vacuum Insulation [VI] Explained . . . ", at http://www.estglobal.com/tech-vip.html, 2 pages, Printed Oct. 5, 2004.

Equipment Diagram for Unrestricted Interchange Service Standard, Association of American Railroads, Plate F, Apr. 1, 1978.

PCT International Search, PCT US2004/027519, 8 pages, Aug. 26, 2003.

PCT International Search, PCT US2004/027508, 12 pages, Aug. 26, 2003.

Invitation to Pay Additional Fees; PCT/US2004/027508; 6 pages, Jun. 12, 2004.

Notification of Transmittal of The International Search Report and The Written Opinion of the International Searching Authority for PCT/US2004/027519; 14 pages, Nov. 30, 2004.

Notification of Transmittal of The International Search Report and The Written Opinion of the International Searching Authority for PCT/US2004/027508; 19 pages, Feb. 16, 2005.

* cited by examiner

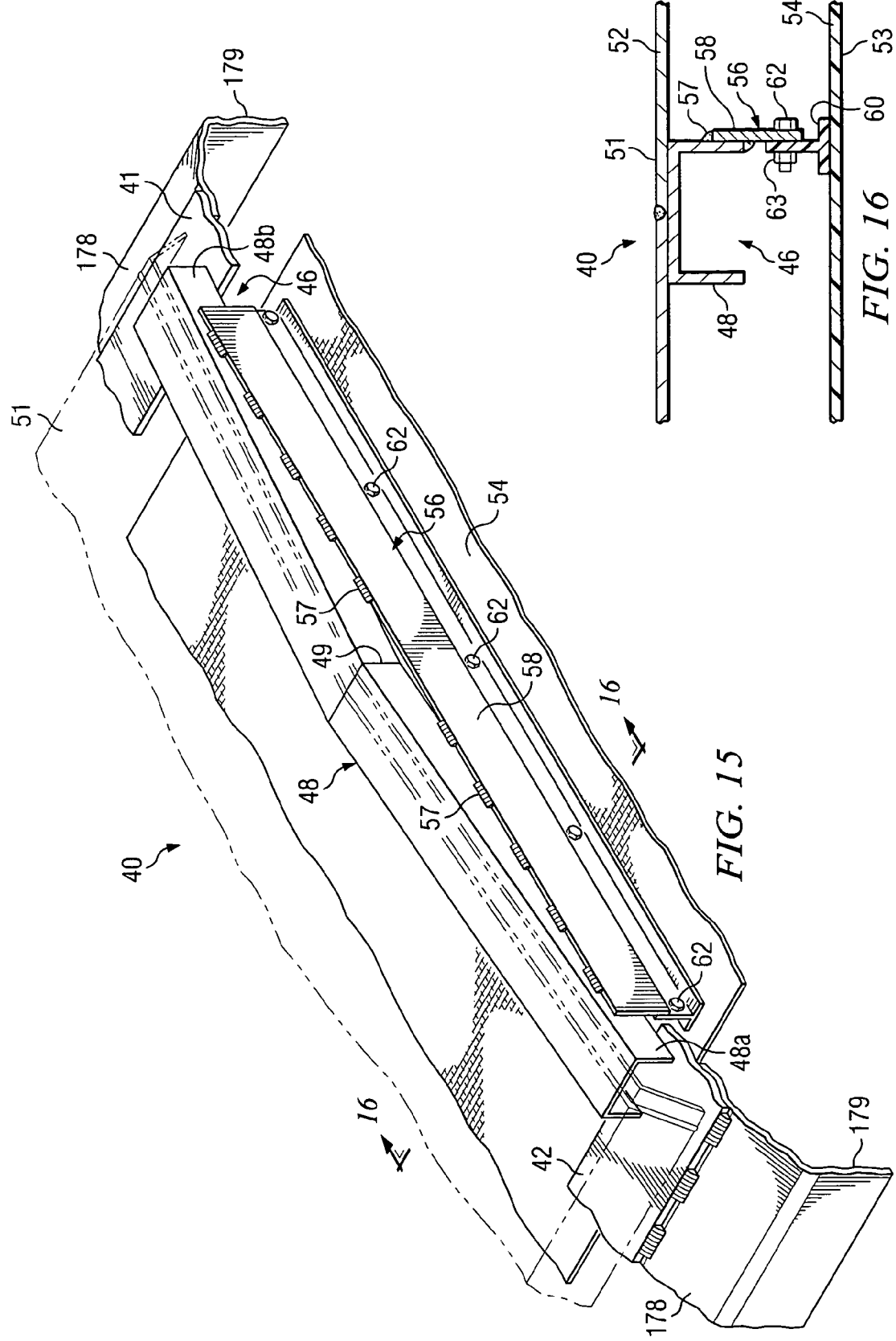

UNIVERSAL BOXCAR WITH EXTERIOR METAL SURFACES

RELATED APPLICATION

This application claims the benefit of U.S. provisional patent application entitled, "Universal Boxcar", application Ser. No. 60/509,935 filed Oct. 9, 2003.

This application is related to patent application entitled "Ceramic/Epoxy Insulated Railway Car", application Ser. No. 10/682,001, Filed Oct. 9, 2003, now abandoned; and patent application entitled, "Boxcar With Load Restraint System", application Ser. No. 10/782,138, filed Feb. 19, 2004, now U.S. Pat. No. 7,004,080 which claims priority from U.S. provisional patent application 60/509,935 filed Oct. 9, 2003; and patent application entitled "Universal Boxcar", application Ser. No. 10/960,221 filed Oct. 7, 2004, now U.S. Pat. No. 7,210,413, which claims priority from U.S. Provisional patent application 60/509,935 filed Oct. 9, 2003.

TECHNICAL FIELD

The present invention is related to railway cars and more particularly to insulated boxcars with exterior metal surfaces and load carrying capabilities equal to or better than uninsulated boxcars with the same AAR clearance plate.

BACKGROUND OF THE INVENTION

Over the years general purpose boxcars have progressed from relatively simple wooden structures mounted on flat cars to more elaborate arrangements including insulated walls and refrigeration equipment. Various types of insulated and uninsulated boxcars are presently manufactured and used. A typical boxcar includes an enclosed structure mounted on a railway car underframe. The enclosed structure generally includes a floor assembly, a pair of sidewalls, a pair of endwalls and a roof assembly. Insulated boxcars often include sidewalls, endwalls and a roof formed in part by an outer shell, one or more layers of insulation and an interior surface.

The outer shell of many boxcars may be formed from various types of metal such as steel or aluminum. The interior surfaces may be formed from wood and/or metal as desired for specific applications. For some applications the interior surfaces may be formed from fiber reinforced plastic (FRP). Various types of sliding doors including plug type doors are generally provided on each side of a boxcar for loading and unloading freight.

The underframe for many boxcars includes a center sill with a pair of end sill assemblies and a pair of side sill assemblies arranged in a generally rectangular configuration corresponding approximately with dimensions of the floor assembly of the boxcar. Cross bearers and/or cross ties may be provided to establish desired rigidity and strength for transmission of vertical loads from the floor assembly to associated side sills which in turn transmit the vertical loads from the floor assembly to associated body bolsters and for distributing horizontal end loads on the center sill to other portions of the underframe. Cross bearers and cross ties generally cooperate with each other to support a plurality of longitudinal stringers. The longitudinal stringers are often provided on each side of the center sill to support the floor assembly of a boxcar.

Applicable standards of the Association of American Railroads (AAR) established maximum total weight on rail for any railway car including boxcars, freight cars, hopper cars, gondola cars, and temperature controlled railway cars within prescribed limits of length, width, height, etc. All railway cars operating on commercial rail lines in the U.S. must have exterior dimensions which satisfy associated AAR clearance plates. Therefore, the maximum load which may be carried by any railway car is typically limited by the applicable AAR clearance plate and empty weight of the railway car.

Reducing the empty weight of a railway car or increasing interior dimensions may increase both volumetric capacity and maximum load capacity of a railway car while still meeting applicable AAR standards for total weight on rail and exterior dimensions for applicable AAR clearance plate. Traditionally, insulated boxcars have less inside height and width than desired for cost effective shipment of some types of lading. The maximum exterior width of an insulated boxcar is limited by applicable AAR clearance plates. The maximum interior width is limited by the amount (thickness) of insulation required to satisfy applicable AAR heat transfer limitations or UA factor. Door operating tubes, door bottom tracks and door handles are often built to the extreme width of applicable AAR plate diagrams. Locating door assembly components at the maximum width provides as much interior width as possible for carrying lading within an insulated boxcar or uninsulated boxcar. Door assembly components for many conventional insulated boxcars may extend approximately four inches (4") from each ride of the boxcar. Therefore, interior dimensions of such boxcars are also limited by the four inch extension of the associated door assemblies.

Conventional insulated boxcars may have an inside width of nine feet or less while many uninsulated boxcars often have an inside width of approximately nine feet, six inches. Prior insulated boxcars have been relatively ineffective at increasing interior volumetric capacity while maintaining desired UA rating or minimum insulation efficiency required by AAR. UA may be generally described as the number of BTU's per hour per degree Fahrenheit which transfer through the roof assembly, sidewall assemblies, endwall assemblies and/or floor assembly of an insulated boxcar.

At least one insulated boxcar has been built with a nominal length of fifty two feet six inches (52' 6") and an interior width of approximately nine feet six inches (9'6"). This particular insulated boxcar had a UA factor of 285 BTU/° F./hour which is greater than applicable AAR requirements. AAR specifications place various requirements on insulated boxcars such as sidewalls, endwalls, floor and roof having a maximum UA factor of 250 BTU/° F./hour for a fifty foot boxcar and a maximum UA factor of 300 BTU/° F./hour for a sixty foot boxcar.

SUMMARY OF THE INVENTION

In accordance with teachings of the present invention, several disadvantages and problems associated with both insulated and uninsulated boxcars and other types of railway cars have been substantially reduced or eliminated. One embodiment of the present invention includes a dual use or universal boxcar which may satisfactorily carry temperature controlled lading or nontemperature controlled lading. The present invention provides a universal boxcar capable of transporting a wide variety of freight, including frozen products and fresh products which require temperature control and dry food, non-food products and paper products which do not require temperature control.

An insulated boxcar incorporating teaching of the present invention may provide the load carrying capacity of a conventional uninsulated boxcar and have substantially the same UA factor or heat transfer rating as a conventional insulated boxcar. A universal boxcar incorporating teachings of the present invention may have the same load pattern and load storage capability as a corresponding uninsulated boxcar. The present invention allows maximizing the interior height and width of an insulated boxcar while satisfying applicable AAR heat transfer ratings (UA factor).

One aspect of the present invention includes providing an insulated boxcar with metal exterior surfaces and interior surfaces formed from composite materials satisfactory for carrying lading such as coiled steel, lumber, beer, wine, newsprint, paper rolls, automobile parts, household appliances, canned food products and/or packaged food products (both perishable and non-perishable). For some applications the interior surfaces may be formed from ballistic resistant materials.

The present invention allows designing sidewall assemblies and endwall assemblies with reasonably priced insulating materials having optimum thickness to minimize heat transfer rates between the interior and the exterior of the sidewall assemblies and to maximize interior load carrying capacity. Vacuum insulation or vacuum panels may sometimes be used in addition to more traditional urethane insulation. For some applications, insulators may be disposed between selected components of each sidewall assembly and associated side sill to satisfy applicable heat transfer ratings. The present invention provides an insulated boxcar with increased insulation efficiency and satisfactory heat transfer rates and at the same time satisfying all applicable AAR specifications.

Further technical benefits of the present invention include providing a double seal assembly for doors associated with insulated boxcars. The use of a double seal assembly between a door and an adjacent frame assembly substantially reduces heat transfer when the door is in its closed position. Conventional insulated boxcars often include a single door seal gasket. When a single seal gasket becomes worn or torn, air may communicate through the damaged seal resulting in heat transfer rates greater than allowed by AAR specifications. A second seal formed in accordance with teachings of the present invention improves the life and durability of the door seal system and provides an added thermal barrier by trapping air between the first seal and the second seal. The second seal may have various configurations shapes such as a "shark tooth" shape, round shape or other conventional seal shapes. The second seal may be mounted all around the entire perimeter of the door or parallel with the existing first door gasket seal. A double seal assembly formed in accordance with teachings of the present invention provides improved insulation as well as a redundant seal in the event of failure of one of the seal mechanisms.

Technical benefits of the present invention include providing an insulated boxcar having an increased interior height and width while maintaining exterior height and width of the boxcar within maximum limits prescribed by the American Association of Railroads. Sidewalls and endwalls may be formed in accordance with teachings of the present invention using insulation materials which provide desired thermal heat transfer characteristics at a reasonable cost. Depending upon materials selected, insulated boxcars formed in accordance with teachings of the present invention may have UA ratings between approximately 200 and 300.

Some types of lading such as food products have specific requirements for cleaning the interior of a boxcar prior to loading. Water from cleaning and/or condensation may collect in floor located tie down assemblies and cargo anchors resulting in corrosion and increased maintenance costs. Cargo anchors or tie down assemblies located in the floor of a conventional boxcar often rust and prematurely fail as a result of corrosion associated with water retained within such cargo anchors or tie down assemblies. The water may also damage paper products, food and other types of lading. A load restraint system incorporating teachings of the present invention may eliminate or substantially reduce problems associated with cleaning the interior of a boxcar having conventional tie down assemblies and cargo anchors located in an associated floor.

The present invention allows tie down assemblies and anchors associated with many conventional boxcars to be removed from the floor to improve heat transfer characteristics. Tie down assemblies and anchors may be attached to or formed as components of structural members associated with each sidewall assembly in accordance with teachings of the present invention. Placing anchors and tie down assemblies in adjacent sidewall assemblies allows improved cleaning of an associated floor and provides a generally smooth floor surface satisfactory for carrying lading such as paper rolls or any other lading which may be damaged by conventional tie down assemblies and cargo anchors located in a floor.

One aspect of the present invention includes placing one or more tie down assemblies or anchor assemblies in the sidewalls of an insulated boxcar and preferably having no tie down assemblies or anchor assemblies disposed within the floor of an insulated boxcar. Eliminating tie down assemblies or anchor assemblies from the floor generally improves heat transfer characteristics of the insulated boxcar. Tie down assemblies and anchors located in the floor of a conventional insulated boxcar often act as thermal shorts which increase heat transfer rates through the floor.

Tie down assemblies and cargo anchors attached to a sidewall assembly in accordance with teachings of the present invention may have substantially increased load carrying capacity as compared with prior sidewall tie down assemblies or cargo anchors. For example floor anchors associated with conventional boxcars may be used to restrain loads weighing thirty thousand pounds (30,000 lbs.). Conventional sidewall anchors are often not able to support this much load. Tie down assemblies and cargo anchors formed in accordance with teachings of the present invention may be satisfactorily used to restrain thirty thousand pound steel coils while maintaining desired heat transfer characteristics of an associated railway car and eliminating or reducing potential risk of corrosion.

BRIEF DESCRIPTION OF THE DRAWINGS

For a more complete understanding of the present invention, and the advantages thereof, reference is now made to the following written description taken in conjunction with the accompanying drawings, in which:

FIG. 15 is a schematic drawing showing an isometric view with portions broken away of one example of a roof assembly incorporating teachings of the present invention; and FIG. 16 is a schematic drawing in section with portion broken away taken along lines 16-16 of FIG. 15.

DETAILED DESCRIPTION OF THE INVENTION

Figure 1A:
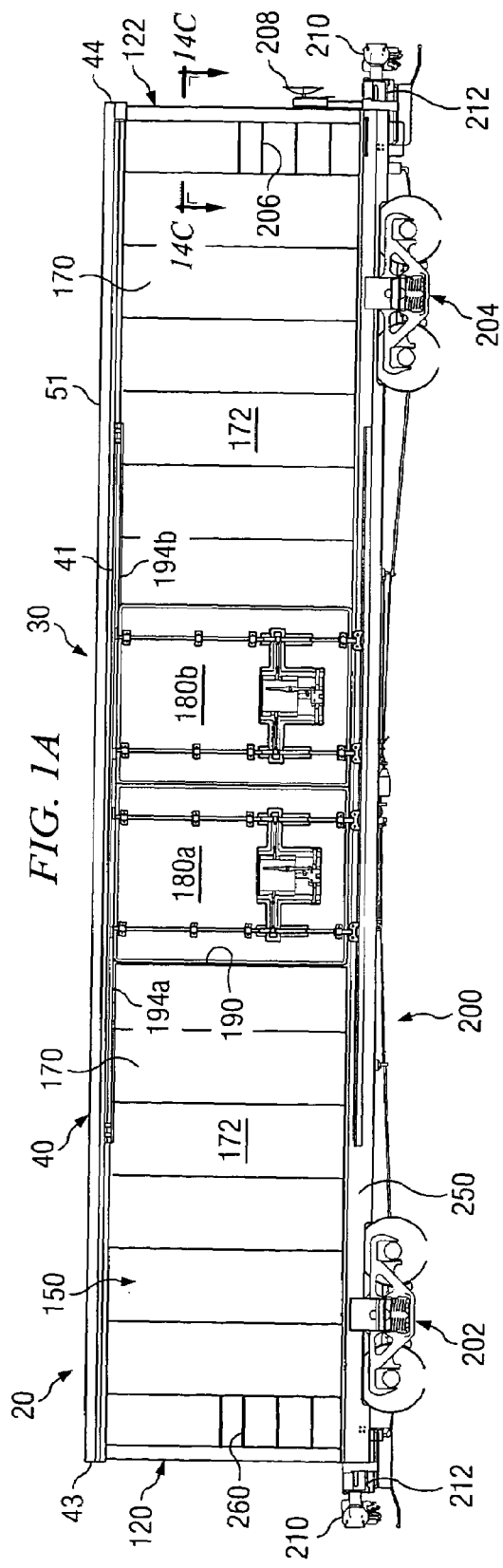
FIG. 1A is a schematic drawing in elevation showing a side view of an insulated boxcar incorporating teachings of the present invention.

Preferred embodiments of the invention and its advantages are best understood by reference to FIGS. 1-16 of the drawings, like numerals are used for like and corresponding parts in the various drawings.

The term "boxcar" often refers to a railway car having a generally elongated box type structure defined in part by a roof assembly, a floor assembly, a pair of sidewall assemblies, and a pair of endwall assemblies which cooperate with each other to define a generally hollow interior satisfactory for carrying various types of lading. The terms "boxcar" and "box car" may be used in this application to refer to both insulated and uninsulated boxcars.

The term "insulated boxcar" may be used in this application to refer to a boxcar formed at least in part with insulating materials to minimize heat transfer through associated sidewall assemblies, endwall assemblies, roof assemblies and/or floor assemblies. Insulated boxcars do not generally include refrigeration systems or temperature control systems. The AAR has several different classes of insulated boxcars such as VM-partially insulated fruit, vegetable ventilated box; VS-insulated fruit, vegetable ventilated box; and LRC-heavily insulated boxcar for solid carbon dioxide.

The terms "side sheet" and "side sheets" may be used in this application to refer to any type of material satisfactory to form exterior and/or interior surfaces of a sidewall assembly. For some applications, side sheets may be formed from wood, metal, composite materials or combinations thereof. Steel alloys and aluminum alloys are examples of metals which may be used to form side sheets for a boxcar incorporating teachings of the present invention. Composite materials such as fiber reinforced plastics in the form of rolls, sheets or extruded panels may be used to form side sheets for a boxcar incorporating teachings of the present invention. Other examples of composite materials which may be used to form side sheets include, but are not limited to, polyvinyl chloride (PVC), plastic polymers, fiber reinforced polyamides such as fiber reinforced nylon and other polymeric materials. Side sheets may be formed from composite materials using various techniques such as extrusion and pultrusion.

The terms "end sheet" and "end sheets" may be used in this application to refer to any type of material satisfactory to form exterior and/or interior surfaces of an endwall assembly. For some applications, end sheets may be formed from wood, metal, composite materials or combinations thereof. Steel alloys and aluminum alloys are examples of metals which may be used to form end sheets for a boxcar incorporating teachings of the present invention. Composite materials such as fiber reinforced plastics in the form of rolls, sheets or extruded panels may be used to form end sheets for a boxcar incorporating teachings of the present invention. Other examples of composite materials which may be used to form end sheets include, but are not limited to, polyvinyl chloride (PVC), plastic polymers, fiber reinforced polyamides such as fiber reinforced nylon and other polymeric materials. End sheets may be formed from composite materials using various techniques such as extrusion and pultrusion.

The terms "tie down assembly", "cargo hold down assembly", "lading anchor" and "cargo anchor" may be used in this application to refer to any device, mechanism or assembly operable to secure lading at a desired location within a boxcar.

Various aspects of the present invention will be described with respect to insulated boxcars 20 and 20a. However, the present invention is not limited to insulated boxcars. For example, some features of the present invention may be satisfactorily used to form uninsulated boxcars, temperature controlled railway cars, refrigerated boxcars and any other type of railway car having at least one sidewall assembly and a floor assembly mounted on a railway car underframe. The term "railway car" may be used in this application to include insulated boxcars, uninsulated boxcars, refrigerated boxcars and temperature controlled boxcars.

A railway car may be formed in accordance with teachings of the present invention to accommodate various geometric configurations and load carrying requirements to satisfy specific customer needs concerning size and temperature specifications for different types of lading. Examples of such lading include, but are not limited to, coiled steel, coiled aluminum, lumber, pasteurized and unpasteurized beer, wine, automobile parts, household goods, household appliances, electronic equipment, liquid filled containers, paper rolls, paper products, nonperishable food products and any other product suitable for transport in a boxcar with or without temperature control. Further examples of such lading include, but are not limited to, perishable food products (fresh, canned and packaged) and any other product suitable for transport in a boxcar and requires temperature control.

The present invention allows insulated boxcars 20 and 20a to have flexible loading capability to improve potential for carrying back-haul loads. Insulated boxcars 20 and 20a may be used to carry lading associated with both insulated and uninsulated boxcars and may sometimes be referred to as "universal" boxcars. In the past, materials, configuration, size and components of conventional insulated boxcars often limited their ability to be effectively used to carry lading associated with uninsulated boxcars. To accommodate cargo that would typically be shipped using an uninsulated boxcar, insulated boxcars 20 and 20a may include interior surfaces formed at least in part from ballistic resistant materials and may have interior volumes equal to or greater than many uninsulated boxcars while meeting or exceeding requirements established by the AAR for insulated boxcars.

Figure 1B:
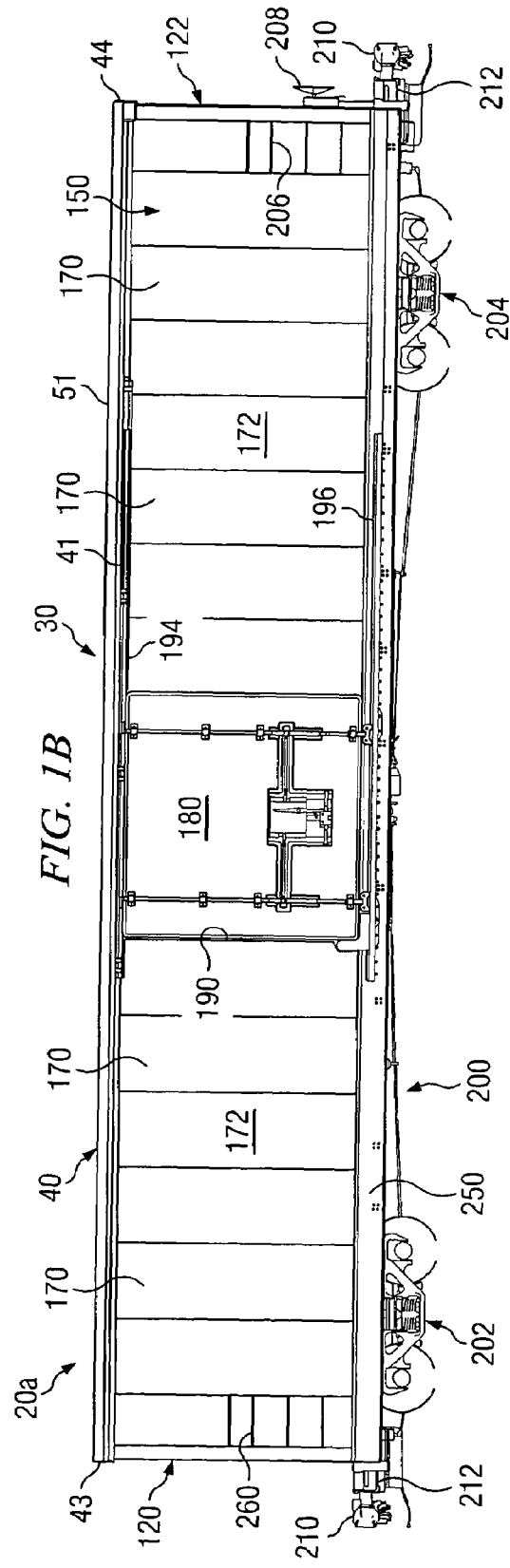
FIG. 1B is a schematic drawing in elevation showing a side view of another insulated boxcar incorporating teachings of the present invention.
Figure 2:
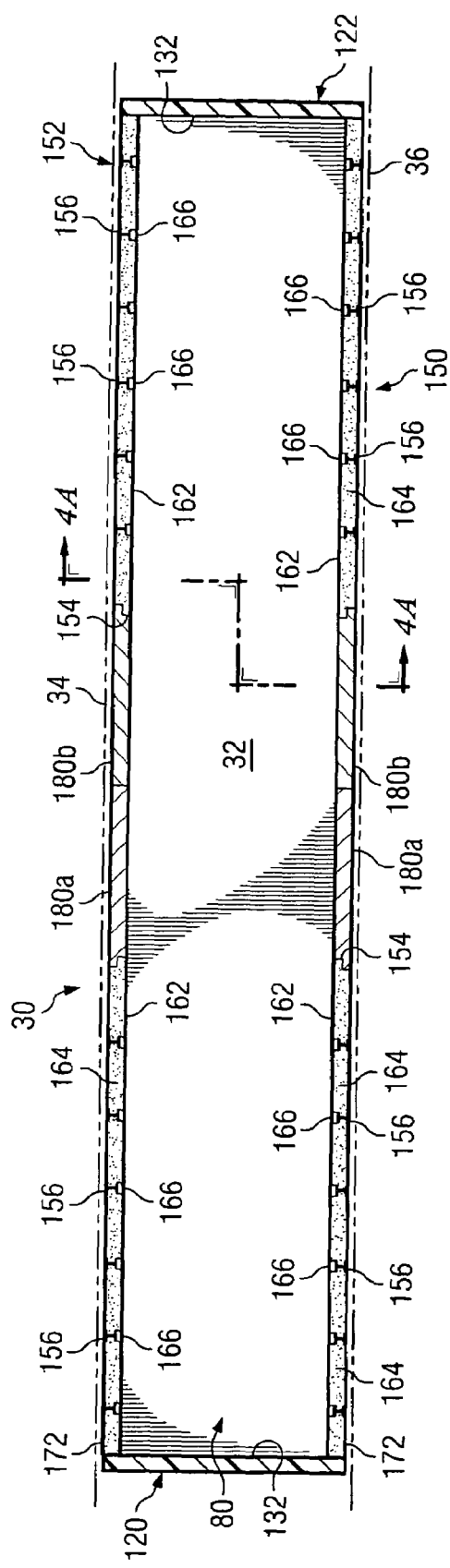
FIG. 2 is a schematic drawing in section with portions broken away showing a floor assembly, sidewall assemblies and endwall assemblies incorporating teachings of the present invention.
Figure 3:
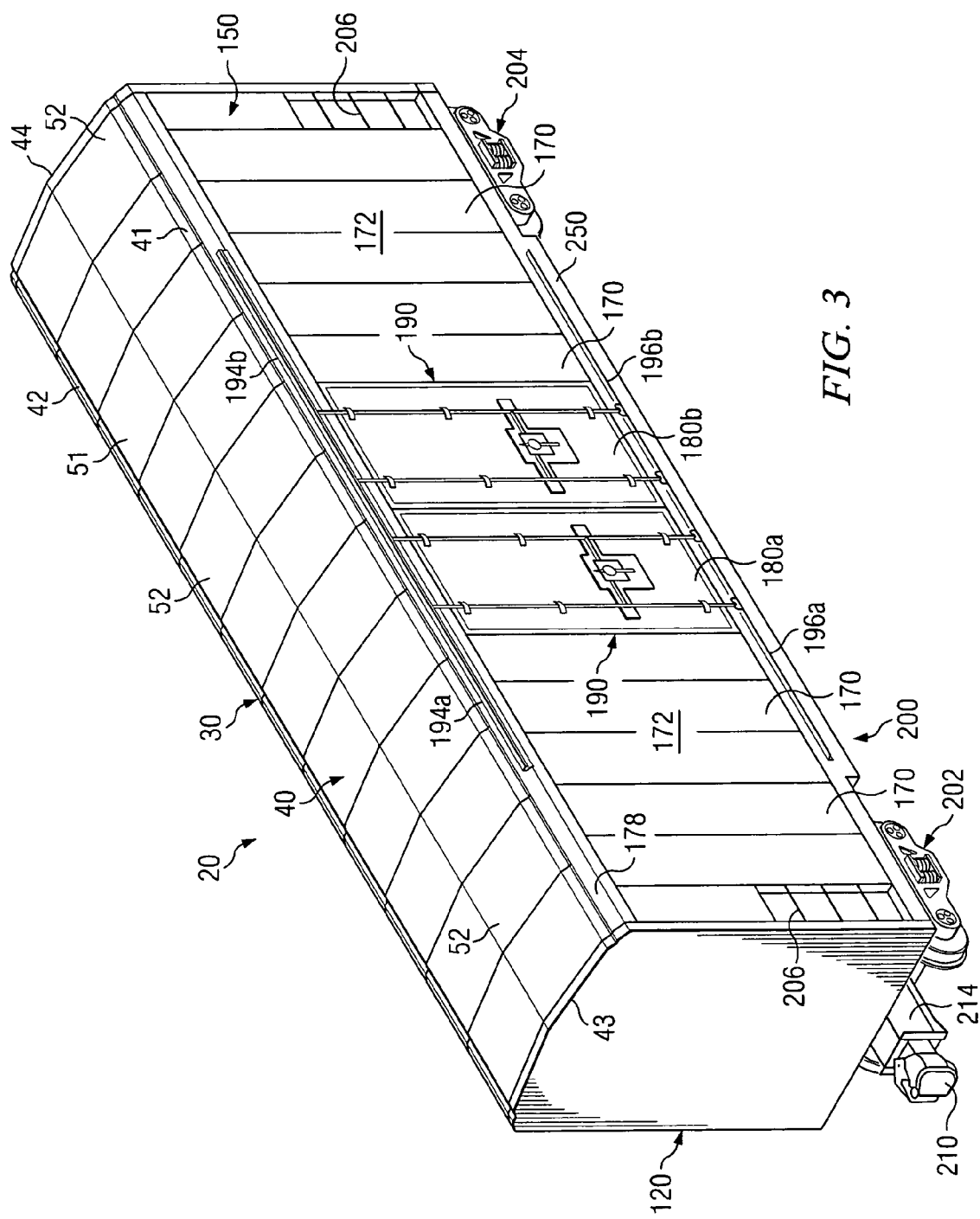
FIG. 3 is a schematic drawing showing an isometric view of the insulated boxcar of FIG. 1A.

Insulated boxcar 20 incorporating teachings of the present invention is shown in FIGS. 1A, 2 and 3 with box structure 30 mounted on railway car underframe 200. Insulated boxcar 20a incorporating teachings of the present invention is shown in FIG. 1B with box structure mounted on railway car underframe 200. Various features of the present invention as shown in FIGS. 4A-16 may be used with insulated boxcars 20 and 20a or other railway cars. As discussed later in more detail, insulated boxcar 20 and associated box structure 30 may include respective double side doors 180a and 180b mounted on each sidewall assembly 150 and 152. Double side doors 180a and 180b may be used with sidewall assemblies 150 and 152 having respective openings 154 with a nominal width of sixteen feet or greater.

Insulated boxcar 20a and associated box structure may include respective single side door 180 mounted on each sidewall assembly 150 and 152. A single side door is typically mounted on sidewall assemblies having door openings less than sixteen feet in width. For example, the door opening 154 associated with sidewall assemblies 150 and 152 of box structure 30 may have a nominal width of twelve feet. The various components associated with insulated boxcar 20 and insulated boxcar 20a may be substantially similar except for the differences in the width of openings 154 required to accommodate and double side doors 180a and 180b or single side door 180. Also, additional door tracks may be mounted on sidewall assemblies 150 and 152 to accommodate double side doors 180a and 180b.

For some applications, insulated boxcars 20 and/or 20a may be modified to include a temperature control system (not expressly shown) and an airflow management system (not expressly shown). For embodiments of the invention such as shown in FIGS. 1A-16, insulated boxcars 20 and 20a may have a nominal interior length of sixty feet, exterior dimensions which satisfy the Association of American Railroads (AAR) Plate F clearance requirements and associated AAR design and heat transfer requirements. For some applications boxcars 20 and 20a may have an interior length of approximately sixty feet nine inches (60' 9"), an interior width of approximately nine feet five inches (9' 5") or greater, and an interior height at the centerline of approximately twelve feet ten and one-half inches (12' 10½"). For some applications, the interior width may be approximately nine feet six inches (9' 6"). Insulated boxcars 20 and 20a are only examples of universal boxcars which may be formed in accordance with teachings of the present invention.

Figure 4A:
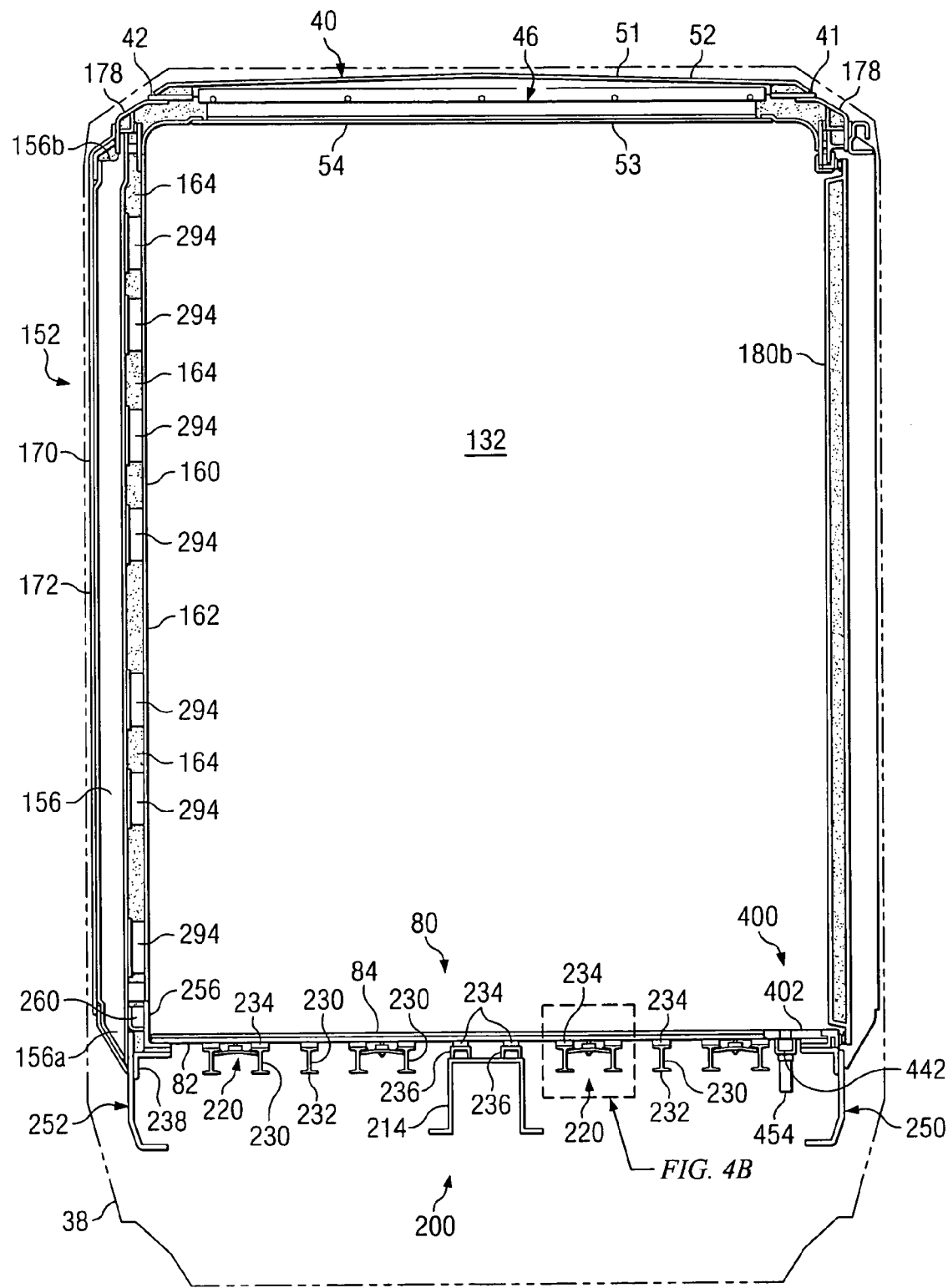
FIG. 4A is a schematic drawing in section with portions broken away taken along lines 4A-4A of FIG. 2.

Forming various components of box structure 30 and railway car underframe 200 in accordance with teachings of the present invention may reduce the empty weight of insulated boxcars 20 and 20a while at the same time increasing interior volume and/or load carrying capacity as compared to many conventional insulated boxcars with the same AAR Plate F clearance and UA factor. For some applications insulated boxcars 20 and 20a may have the same or larger interior volume or load carrying capacity as compared to uninsulated boxcars satisfying AAR Plate F clearance requirements. Dotted lines 34 and 36 as shown in FIG. 2 represent the maximum allowed AAR clearance for boxcar 20. Dotted line 38 as shown in FIG. 4A also represents applicable AAR clearance plate dimensions and configuration.

Box structure 30 may be formed from various components including roof assembly 40, sidewall assemblies 150 and 152, floor assembly 80 and endwall assemblies 120 and 122. Openings 154 in sidewall assemblies 150 and 152 may be modified to accommodate single side door 180 or double side doors 180a and 180b. Double door assemblies 180a and 180b may move between a first, closed position as shown in FIGS. 1A and 3, and a second, open position (not expressly shown). Single door assembly 180 may move between a first, closed position as shown in FIG. 1B and a second, open position (not expressly shown).

Portions of the roof assembly 40, floor assembly 80, sidewall assemblies 150 and 152 and/or endwall assemblies 120 and 122 may be formed from conventional materials such as steel alloys and/or other metal alloys used to manufacture railway cars. Portions of the roof assembly 40, floor assembly 80, sidewall assemblies 150 and 152 and/or endwall assemblies 120 and 122 may also be formed with insulating materials such as urethane foam and polyvinyl chloride blocks. Closed cell urethane foams are often used in insulated boxcars. Examples of some materials which may be used to form a railway car incorporating teachings of the present invention are discussed throughout this application.

Various components associated with box structure 30 may be fabricated individually and then attached to or mounted on railway car underframe 200 to form respective insulated boxcars 20 and 20a. Individually manufacturing or fabricating various components of box structure 30 may allow optimum use of conventional railcar manufacturing techniques. Alternatively, one or more components associated with box structure 30 may be fabricated and assembled on railway car underframe 200 to allow optimum use of conventional railcar manufacturing techniques. For some applications such components may be fabricated at the same facility. For other applications one or more components may be fabricated at a remotely located facility. Each component may be attached to railway car underframe 200 in accordance with teachings of the present invention.

For embodiments of the present invention as shown in FIGS. 1A-16 portions of railway car underframe 200 may be manufactured and assembled using conventional railcar manufacturing procedures and techniques. Railway car underframe 200 preferably includes a pair of railway car trucks 202 and 204 located proximate each end of railway car underframe 200. Standard railcar couplings 210 are provided at each end of railway car underframe 200. Each coupling 210 preferably includes respective end of car cushioning unit 212 disposed at each end of center sill 214. Hand brake 208 may be mounted on one end of railway car underframe 200. Ladders 206 may be mounted on exterior portions of sidewall assemblies 150 and 152 adjacent to endwall assemblies 120 and 122. See FIGS. 1A, 1B and 3.

Railway car underframe 200 may include a pair of body bolsters 240 and 242 with each body bolster disposed over respective railway trucks 202 and 204. Body bolsters 240 and 242 may extend laterally from center sill 214. See FIG. 8. For some applications, body bolsters 240 and 242 may include respective cover plates 241a, 241b, 243a and 243b attached thereto and extending over the wheels of associated railway car trucks 202 and 204. Railway car underframe 200 may include center sill 214, longitudinal stringers 230, cross bearers 216 and/or cross ties 218, body bolsters 240 and 242 and side sill assemblies 250 and 252 arranged in a generally rectangular configuration. Cross bearers 216 and cross ties 218 are typically attached to and extend laterally from center sill 214.

Railway car underframe 200 preferably includes a plurality of longitudinal stringers 230 which extend approximately the full length of railway car underframe 200 parallel with center sill 214. Longitudinal stringers 230 may be disposed on cross bearers 216 and cross ties 218. FIGS. 4A, 4B 5, 9 and 10 show portions of floor assembly 80 disposed on longitudinal stringers 230 and respective portions of side sill assemblies 250 and 252. The number of cross bearers 216 and/or cross ties 218 and longitudinal stringers 230 may be varied depending upon desired load carrying characteristics for associated insulated boxcars 20 and 20a.

Figure 4B:
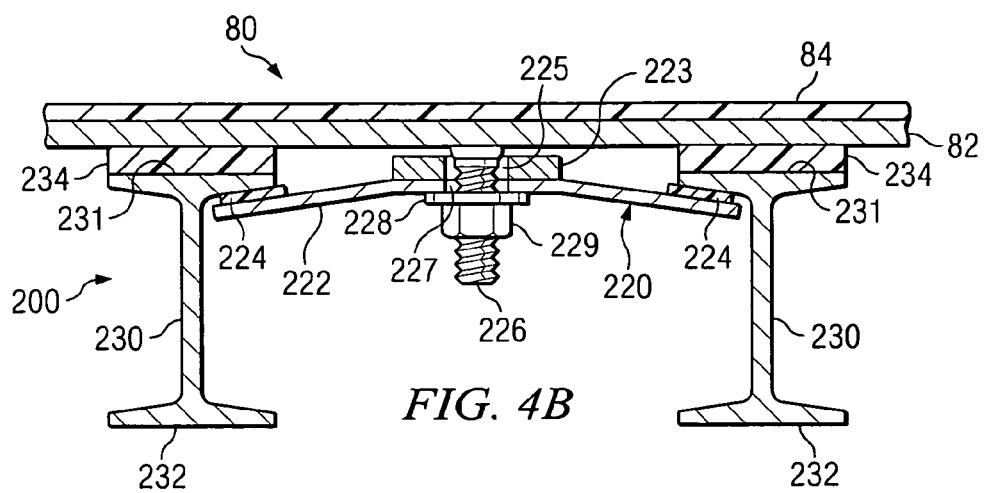
FIG. 4B is a schematic drawing in section with portions broken away showing one example of a floor restraint assembly engaged with adjacent portions of a railway car underframe in accordance with teachings of the present invention.

Each longitudinal stringer 230 may include first surface 231 and second surface 232 which rests upon cross bearers 216 and cross ties 218. For some applications portions of floor assembly 80 may be adhesively bonded with portions of first surfaces 231 of longitudinal stringers 230. For other applications floor restraint assemblies 220 such as shown in FIGS. 4A and 4B may be used to secure portions of floor assembly 80 with adjacent portions of railway car underframe 200. Also, various types of mechanical fasteners such as Huck® fastener 412 may be used to secure portions of floor assembly 80 with adjacent portions of railway car underframe 200. See FIG. 11.

Nonmetallic isolators 234 may be disposed between adjacent portions of floor assembly 80 and longitudinal stringers 230 of railway car underframe 200. Similar types of nonmetallic isolators 234 may also be disposed between longitudinal supports 256 and angles 238. A pair of U-shaped or C-shaped channels may be attached to and extend longitudinally along center sill 214. Isolators 234 may be disposed between floor assembly 80 and C-shaped channels 236. A plurality of isolators 234 may also be disposed on between floor assembly 80 and body bolsters 240 and 242. See FIGS. 4A, 4B, 5, 8, 9, 10, and 11.

Respective angles 238 may be attached with each side sill assemblies 250 and 252. Angels 238 may extend longitudinally along approximately the full length of each side will assembly 250 and 252. Various types of mechanical fasteners such as Hucks® and/or bolts may be satisfactorily used to attach angles 238 with adjacent portions of respective side will assemblies 250 and 252.

Nonmetallic isolators 234 may be formed from various types of insulating materials which have both satisfactory strength and heat transfer characteristics to provide desired UA factor for box structure 30. For some applications isolators 234 may be formed from fiber reinforced plastic and other composite materials. Pultruded Fiberglass® strips may be satisfactorily used to form isolators 234. Such Fiberglass® pultrusions may also be installed at various locations between sidewall assemblies 150 and associated portions of railway car underframe 200 to reduce thermal leakage through associated mechanical connections. PVC and polycarbonate based materials may also be used to form isolators 234 for some applications.

For some applications floor assembly 80 may include a plurality of metal sheets 82 disposed on longitudinal stringers 230. To improve the heat transfer characteristics of floor assembly 80 and to prevent undesired abrasion and/or wear of lading such as paper rolls and paper products, a sheet or layer of polymeric material 84 may be disposed on metal plate 82 opposite from longitudinal stringers 230. See FIGS. 4A, 5, 9, 10 and 11. For some applications polymeric layer 84 may be formed from relatively thick sheets of polyvinyl chloride type material or other suitable composite materials. The surfaces of polymeric layer 84 may be textured to minimize condensation. The amount of texturing may be limited to minimize undesired wear or abrasion of lading disposed thereon. Similar polymeric sheets may be attached to interior surfaces 162 of sidewall assemblies 150 and 152 and/or endwall assemblies 120 and 122.

Sidewall assemblies 150 and 152 may be fabricated with respective side sill assemblies 250 and 252 formed as integral components thereof. Side sill assemblies 250 and 252 may have substantially the same overall configuration and dimensions. As shown in FIGS. 4A, 5, 9, 10 and 11 side sill assemblies 250 and 252 may have a generally "J" shaped cross section. Side sill assemblies 250 and 252 may be manufactured by various techniques including roll forming.

Respective cargo anchor support members 256 may be attached to side sill assembly 250 and 252 at the longitudinal junction with assemblies 150 and 152. Support members 256 may extend along substantially the full length of the respective side sill assemblies 250 and 252 and form portions of associated floor cargo anchor system 270. For the embodiment of the present invention as shown in FIGS. 4A, 5A, 5B, 9 and 10 support members 256 may be formed from metal angles having desired dimensions compatible with railway car underframe 200, floor assembly 80 adjacent portions of sidewall assemblies 150 and 152. Support members 256 may be welded with or otherwise securely attached with adjacent portions of side sill assemblies 250 and 252. For some applications, a plurality of HUCK® fasteners 264 may be used to attach support members 256 with respective angles 238.

For embodiments such as shown in FIGS. 1A-16, sidewall assemblies 150 and 152 may have relatively uniform thickness extending between endwall assembly 120 and endwall assembly 122. For some applications sidewall assemblies 150 and 152 may have an overall thickness of approximately five and nine sixteenths inches (5%16"). For some locations with less than three inches (3") of available space installing insulating materials, high performance vacuum insulation may be used. Vacuum insulation and vacuum panels are available from several sources including, but not limited to, Energy Storage Technologies located in Dayton, Ohio. Sidewall assemblies 150 and 152 may have generally symmetrical configurations with respect to each other and other components of an associated railway car.

Each sidewall assembly 150 and 152 may be formed in part by a plurality of side sheets. For embodiments such as shown in FIGS. 4A, 5A, 5B, 9, and 10 interior side sheets 160 cooperate with each other to form interior surfaces 162 of each sidewall assembly 150 and 152. Exterior side sheets 170 cooperate with each other to form exterior surfaces 172 of each sidewall assembly 150 and 152. See FIGS. 1A, 1B, 3, 4A, 6, 9 and 10. For some applications side sheets 170 and 160 may be formed from metal alloys. For other applications side sheets 170 may be formed from metal alloys and side sheets 160 may be formed from wood and/or composite materials. Conventional insulating materials such as closed celled urethane foam 164 may be disposed between and bonded with adjacent portions of side sheets 160 and 170. See FIGS. 2, 11 and 12.

Each side sheet 170 may include first surface 170a and second surface 170b. First surface 170a of side sheets 170 cooperate with each other to form portions of exterior surfaces 172 of box structure 30. For one application side sheets 170 may be formed from twelve (12) gauge steel. The configuration of exterior surfaces 172 of sidewall assemblies 150 and 152 may correspond with AAR Clearance plate F represented by dotted lines 34, 36 and 38.

Side sheets 160 may be formed from various types of material such as fiber reinforced plastic or other light weight materials. For some applications side sheets 160 may be formed from rolls of Fiberglass® material. For some applications relatively thin sheets of polymeric material (not expressly shown) may be disposed adjacent to and bonded with side sheets 160. The surfaces of such polymeric side sheets may be abraded to reduce condensation. The use of such polymeric sheets was discussed with respect to floor assembly 80.

For other applications, side sheets 160 may be formed from composite materials such as graffiti resistant, pigmented fiber reinforced plastic. For example, side sheets 160 may be formed from tough, lightweight, relatively rigid material having high impact resistance available from U.S. Liner Company, a division of American Made, Inc. under the trademark Bulitex® and other types of ballistic resistant composite materials. Bulitex material may be generally described as a ballistic grade composite scuff and wall liner. For some applications the ballistic resistant material may be treated to substantially reduce or eliminate mold or mildew and condensation on interior surfaces 162. The ballistic resistant material may also be textured to assist with minimizing condensation.

A plurality of side stakes or support posts 156 may be disposed between side sheets 170 and side sheets 160 of sidewall assemblies 150 and 152. Each support post 156 includes first end 156a disposed adjacent to and attached with adjacent portions of associated side sill assembly 250 and 252. For some applications, first end 156a of support post 156 may be crushed or swedged to form a generally tapered configuration corresponding with applicable AAR operating envelope. See dotted lines 38 of FIG. 4a. To assist with swedging or crushing each end 156a a generally V-shaped section (not expressly shown) may be also cut from the web portion of each support post 156 at first end 156a. Various welding techniques and/or mechanical fasteners may be used to attach first ends 156a with adjacent portions of side sill assemblies 250 and 252. Each support post 156 also includes second end 156b which may be attached to respective top chords 178 adjacent to roof assembly 40. See FIGS. 4A, 5A, 5B, 6, 9 and 10.

Support post 156 may have the general configuration of an "I-beam". First surface 157 of support posts 156 may be attached with or bonded to second surface 170b of associated side sheets 170. Second surface 158 of each support post 156 preferably projects toward the interior of box structure 30. See FIGS. 4A, 5A, 5B, 6, 9, 10 and 13. Conventional welding techniques associated with manufacturer and assembly of railway cars may be satisfactorily used to attach side sheets 170 with support posts 156.

Various types of nonmetallic isolators may be disposed between side sheets 160 with second surface 158 of support posts 156. Nonmetallic isolators 166 may be attached to interior surface or second surface 158 of each support post 156. For some applications nonmetallic isolators 166 may be formed from polyvinyl chloride (PVC) type materials and may have a generally rectangular cross section. Side sheets 160 may then be bonded with nonmetallic isolators 166 opposite from respective support posts 156. Nonmetallic isolators 166 may also be formed from urethane foam, fiber reinforced plastic and other suitable insulating materials.

Placing nonmetallic isolators 166 between support post 156 and adjacent portions of side sheets 160 provides sufficient structural strength for side sheets 160 and minimizes heat transfer through support posts 156 between the interior and exterior of box structure 30. The present invention is not limited to use of PVC strips, PVC blocks, fiber reinforced plastic or urethane foam blocks. Any nonmetallic material having satisfactory heat transfer characteristics and satisfactory structural support may be used to form nonmetallic isolators 166.

Insulating material 164 may be injected or poured into void spaces defined in part by side sheets 160, support posts 156, nonmetallic isolators 166 and side sheets 170. For some applications pour type urethane foam may be injected into void spaces formed between side sheets 160 side sheets 170. Pour foam may generally be injected faster into such void spaces and will generally cure faster as compared to other types of urethane foam. Since pour foam often experiences higher pressures while curing, sidewall assemblies 150 and 152 may be placed in appropriate fixtures (not expressly shown) during the curing process.

After sidewall assemblies 150 and 152, endwall assemblies 120 and 122 and roof assembly 80 have been mounted on and attached to railway car underframe 200, froth foam may be added to or sprayed into any remaining void spaces. For example, froth foam may be injected into void spaces formed between roof assembly 40, respective sidewall assemblies 152 and 150 and door frame assembly 190. See FIGS. 4A-7. Froth foam may also be injected into void spaces formed between roof assembly 40 and endwall assemblies 120 and 122. Pour type urethane foam may be obtained from various suppliers including, but not limited to, Carpenter Company. Froth foam may also be obtained from various suppliers including, but not limited to, Foam Supplies, Inc.

Endwall assemblies 120 and 122 may be formed using similar materials and techniques as previously described with respect to sidewall assemblies 150 and 152. Endwall assemblies 120 and 122 may also be formed with all or at least portions of respective end sill assemblies formed as integral components thereof. See angle 133 in FIG. 14B. Endwall assemblies 120 and 122 may be formed with end beams 126 having an I-beam configuration. End beams 126 disposed within endwall assemblies 120 and 122 may extend generally horizontally with respect to each other and railway car underframe 200. See FIGS. 14A and 143. U.S. Pat. No. 6,575,102 describes one example of an endwall frame assembly formed from a top plate, end sheets, end beams and edge plates.

End beams 126 may include first surface 127 and second surface 128. End sheets 124 may be attached with first surface 127 of associated I-beams 126. End sheets 124 may be formed from the same materials as side sheets 170. Nonmetallic isolators 129 may be attached with second surface 128 of each I-beam 126 opposite from end sheets 124. Each end beam 126 may include first end 126a and second end 126b. Respective edge plates 123 may be attached with ends 126a and 126b. See FIGS. 14A, 14B and 14C.

End sheets 130 may be attached to or bonded with nonmetallic isolators 129 opposite from associated end beams 126. See FIG. 14B. End sheets 130 may be formed from the same types of materials as side sheet 160. End sheets 130 cooperate with each other to form interior surface 132 of associated endwall assemblies 120 and 122. Each endwall assembly 120 and 122 may include a respective top plate assembly 132 and bottom plate or angle 133 attached with lower portions of adjacent end sheet 124. Bottom plate or angle 133 may be mounted on and securely attached with respective ends 230a and 230b of railway car underframe 200. See FIG. 8. Top plate assembly 132 will be discussed later in more detail with respect to roof assembly 40.

Foam insulation may be disposed between and bonded with adjacent portions of end beams 126, end sheets 124 and end sheets 130. For one embodiment endwall assembly 120 may be mounted on the first end or A end of railway car underframe 200. In a similar manner, endwall assembly 122 may be mounted on the second end or B end of railway car underframe 200.

For one embodiment sidewall assembly 150 may be mounted on one longitudinal edge of railway car underframe 200 with side sill assembly or bottom chord 250 disposed adjacent to ends 216a of cross bearers 216 and ends 218a of cross ties 218. In a similar manner sidewall assembly 152 may be mounted on an opposite longitudinal edge of railway car underframe 200 with side sill assembly or bottom chord 252 disposed adjacent to ends 216b of cross bearers 216 or end 218b cross ties 218. Various types of mechanical fasteners and/or welds may be formed between side sill assemblies 250 and 252 and the respective ends 216a, 216b and 218a and 218b. For some applications Huck® type mechanical fasteners may be used to attach side sill assemblies 250 and 252 with respective ends 216a and 216b of cross bearers 216.

Sidewall assemblies 150 and 152 preferably include respective top chords 178. Top chords 178 may extend longitudinally along respective upper edge of sidewall assemblies 150 and 152. Each top chord 178 may have a cross section defined by a generally "U-shaped" configuration with leg 179 extending therefrom. The upper portion of adjacent side sheets 170 may be attached with leg 179 of associated top chord 178. See FIGS. 6 and 7. Various techniques such as welding and/or mechanical fasteners may be used to attached side sheets 170 with adjacent portions of top chords 178. Roof assembly 40 may be attached to and/or bonded with respective top chords 178 of sidewall assemblies 150 and 152.

Insulating foam is preferably disposed within joints or connections formed between roof assembly 40 and adjacent portions of sidewall assemblies 150 and 15. Trim molding 174 may be bonded with adjacent portions of roof assembly 40 and sidewall assemblies 150 and 152. See FIGS. 6 and 7. Trim molding 174 may be formed from various nonmetallic insulating materials such as pultruded strips of fiber reinforced plastic or molded strips of polyvinyl chloride or any other nonmetallic material having desired structure strength and heat transfer characteristics.

Various types of side doors may be satisfactory used with box structure 30, including doors fabricated from steel and/or wood, or doors fabricated from composite materials. Door assemblies 180, 180a and 180b are preferably formed from materials with thermal insulation characteristics corresponding with the associated sidewall assemblies 150 and 152. Side door 180 or double side doors 180a and 180b may be mounted on respective sidewall assemblies 150 and 152 using conventional hardware such as operating pipes, operating mechanisms, rollers, locking bars, gears and cams associated with conventional railway boxcars. Such items may be obtained from several vendors including YSD Industries, Inc. (Youngstown Steel Door) and Pennsylvania Railcar.

For insulated boxcar 20 double door assemblies 180a and 180b may be slidably mounted on upper track 194 which includes two segments 194a and 194b for respective side doors 180a and 180b. In a similar manner, double side doors 180a and 180b may be slidably mounted on respective lower track segments 196a and 196b. Door assembly 180a may sometimes be referred to as the "auxiliary door" which is generally the first door to be closed and the last door to be opened. Side door 180b may be sometimes described as the main door which is the first door to be opened and the last door to be closed.

The dimensions of associated door frame assembly 190 are preferably compatible with opening 154 sized to accommodate double side doors 180a and 180b. As shown in FIG. 3, upper track segments 194a and 194b may be attached with associated top chord 178. Lower track segments 196a and 196b may be attached with respective side sill assemblies 250 and 252. For insulated boxcar 20a side door 180 will be slidably mounted on upper track 194 and lower track 196 which are attached adjacent to respective openings 154.

Respective door frame assemblies 190 may be attached to the perimeter of each opening 154 formed in sidewall assemblies 150 and 152. Each door frame assembly 190 may include portions of upper track 194 and portions of top chord 178. Each door frame assembly 190 may also include a pair of vertical door post assemblies (not expressly shown) and door header or door retainer 192. For some applications portions of door frame assembly 190 and associated door post may be formed from impact resistant polymeric materials with desired heat transfer characteristics. For example, the door posts and adjacent portions of door assemblies 180a and 180b may be formed from Fiberglass® pultrusions having urethane resin. See FIGS. 7 and 12. For some applications a split I-beam may be used to form door header 192 and provide required structural support for other components of door frame assembly 190 and associated side doors 180a and 180b.

Upper door track 194, lower door track 196, and a threshold (not expressly shown) may also be installed adjacent to each door frame assembly 190. The vertical door posts may be attached with and secured to adjacent portions of sidewall assemblies 150 and 152. Door header 192 may be disposed between and attached to vertical door post assemblies at the top of each opening 154. Metal plates (not expressly shown) and/or an elastomeric threshold may be disposed within the lower portion of each opening 154 adjacent to floor assembly 80. The metal plates and/or threshold may be formed from steel alloys, aluminum alloys, ceramic materials and/or composites of these materials.

Respective door stops (not expressly shown) may be attached with upper door tracks 194, 194a and 194b and lower door tracks 196, 196a and 196b to limit the movement of associated side doors 180, 180a and 180b between their first, closed position and their second, open position. Placing door stops on door tracks 194 and 196 allows increasing exterior dimensions of associated sidewall assemblies 150 and 152 while still complying with applicable AAR clearance plate. As a result, additional insulating material 164 may be disposed between associated side sheets 160 and 170.

A pair of elastomeric gaskets may be formed on the interior of door frame assembly 190 adjacent to the perimeter of the respective door assemblies 180a and 180b. See FIGS. 3 and 12. The elastomeric gaskets preferably contact adjacent portions of door assemblies 180a and 180b when door assemblies 180a and 180b are in their first position. A pair of elastomeric gaskets may also be disposed between overlapping portions of door assemblies 180a and 180b. The elastomeric gaskets cooperate with each other to minimize heat transfer between the interior and the exterior of box structure 30 when door assemblies 180a and 180b are in their first, closed position.

Figure 12:
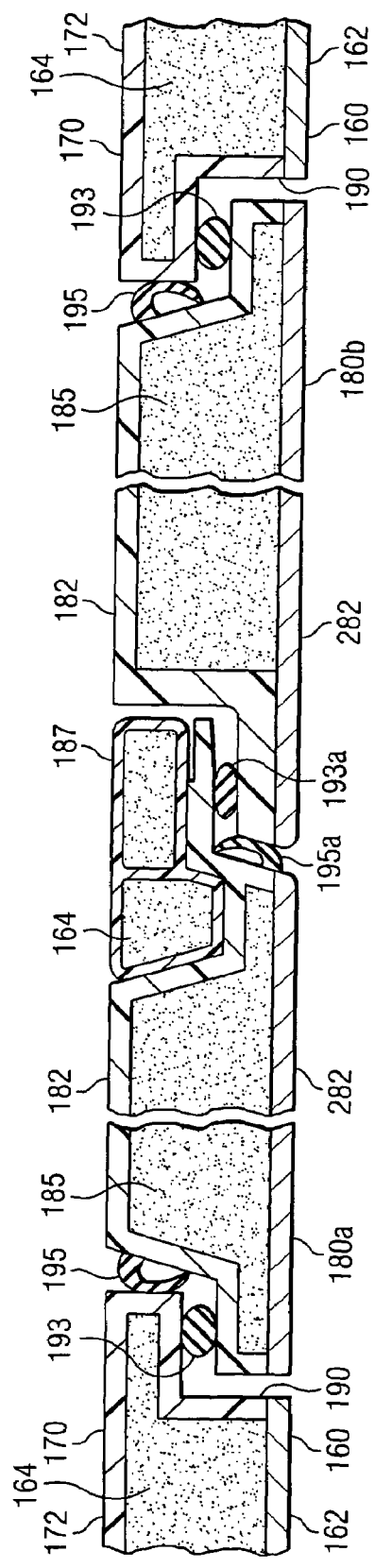
FIG. 12 is a schematic drawing in section with portions broken away showing one example of a double seal assembly disposed between adjacent portions of double side doors.

The door seal assemblies shown in FIG. 12 may include conventional door gasket or seal 193. An additional door gasket or seal 195 having the general configuration of a "sharks tooth" may also be provided. For some applications conventional door gasket or seal 193 may be permanently attached with adjacent portions of door frame assembly 190. Additional door gasket 195 may be permanently attached with adjacent portions of door frame assembly 190. Conventional door gasket 193a and second gasket 195a may be attached to overlapping portions of door assemblies 180a and 180b. However, the location and arrangements of door gaskets and seals 193, 195, 193a and 195a may be varied as desired for each insulated boxcar.

For some applications door assemblies 180a and 180b may include respective door liners 182 with insulating material 185 disposed therein. Extension 187 with insulating material 164 disposed therein may be attached to interior portions of door assembly 180a adjacent to respective liner 182 and opposite from seals 193a and 195a. Extension 187 may be used to improve the heat transfer rating of box structure 30 when door assemblies 180a and 180b are in their first, closed position. Extension 187 may be formed from impact resistant polymeric material.

Exterior surfaces 282 of door assemblies 180a and 180b may be formed from metal sheets or layers such as steel or aluminum. Interior surfaces 284 of door assemblies 180a and 180b may be formed from various polymeric materials such as ballistic resistant materials. Bulitex® sheets may be used to form interior surfaces 284. Each liner 182 may include a perimeter molding or frame to engage insulating material 185 and the ballistic resistant materials with the metal sheets.

Railway cars formed in accordance with teachings of the present invention may include various types of load restraint systems or cargo anchoring systems to prevent undesired movement of lading being shipped within the associated railway car. Railway cars formed in accordance with teachings of the present invention may also include various types of floor restraint assemblies to prevent undesired movement of the floor assembly relative to the associated railway car underframe. Various features of the present invention will be described with respect to tie down assemblies and/or cargo anchor assemblies attached with portions of sidewall assemblies 150 and 152. Various features of the present invention will also be described with respect to floor restraint assemblies disposed between adjacent portions of floor assembly 80 and railway car underframe 200.

For some applications floor assembly 80 may have a generally smooth uniform surface without any tie down assemblies and/or cargo anchor assemblies. See FIG. 2. Various components of the load restraint systems associated with insulated boxcars 20 and 20a are shown in FIGS. 4A, 5A, 5B, 9, 10 and 13. The load restraint system associated with insulated boxcar 20 may also include cargo anchor system 400 shown in FIG. 11. As discussed later in more detail, cargo anchor system 400 may be used with insulated boxcars having sidewall assemblies with relatively large openings designed to accommodate double side doors. However, various features of the load restraint systems associated with insulated boxcars 20 and 20a may be used with a wide variety of railway cars and are not limited to insulated boxcars such as shown in FIGS. 1A-16.

The load restraint systems associated with insulated boxcars 20 and 20a may include floor cargo anchor system 270 and sidewall lading anchor system 290. Various components of floor cargo anchor system 270 will be discussed primarily with respect to FIGS. 5A and 5B. The various components associated with sidewall lading anchor system 290 will be discussed with respect to FIGS. 4A and 13.

Figure 5A:
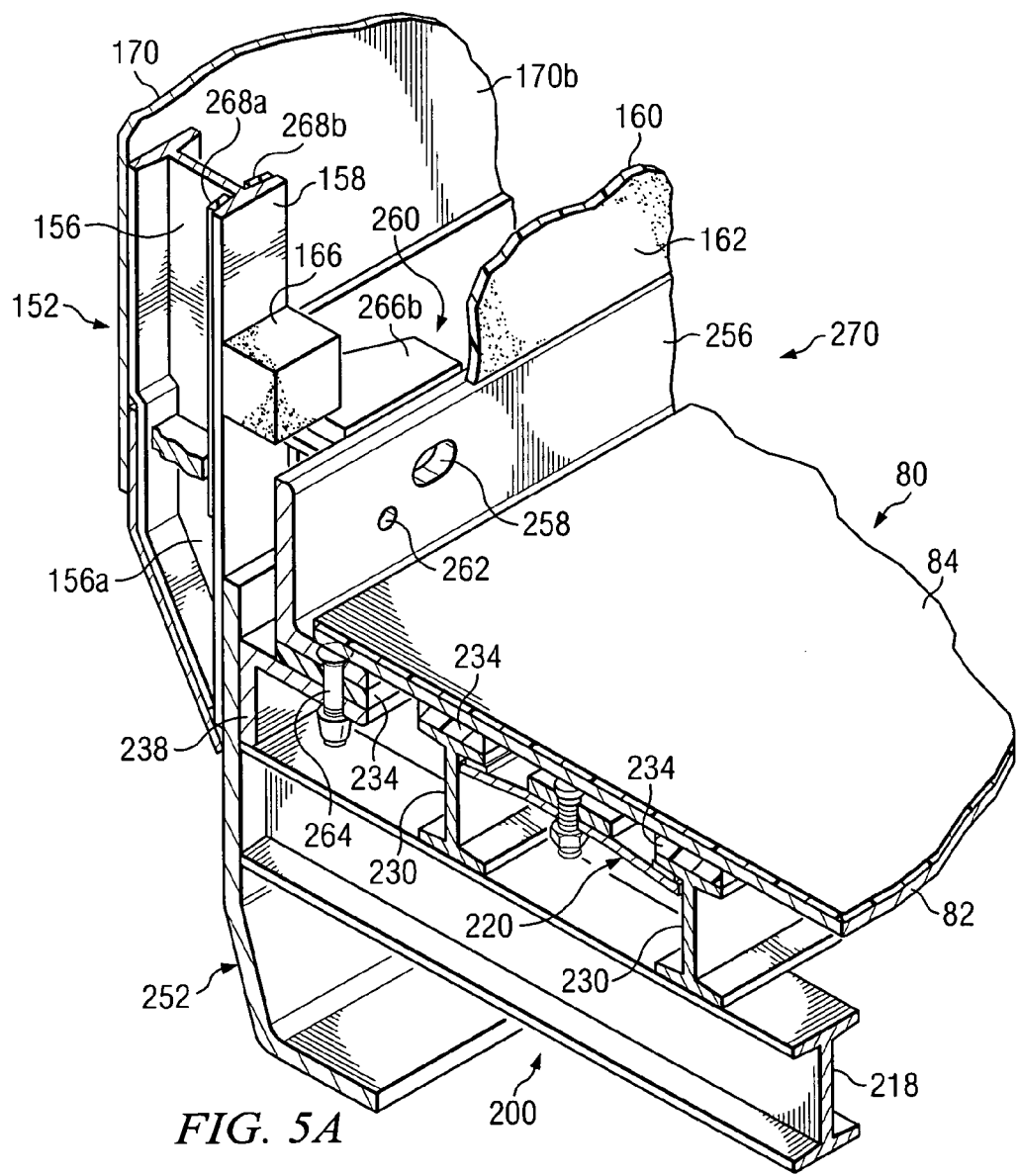
FIG. 5A is a schematic drawing showing an isometric view with portions broken away of one example of a sidewall assembly, floor assembly and adjacent portions of a railway car underframe incorporating teachings of the present invention.
Figure 5B:
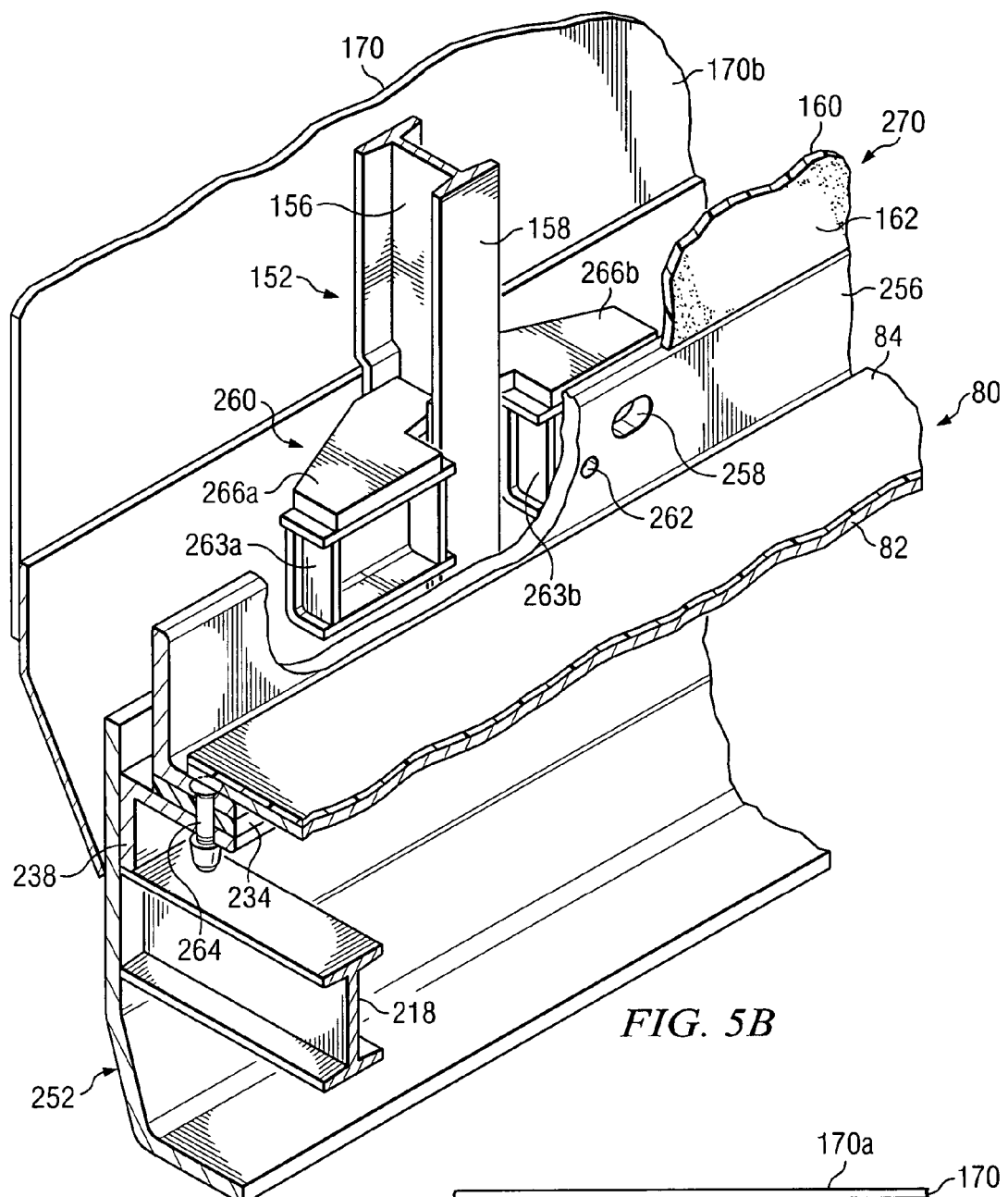
FIG. 5B is a schematic drawing showing an isometric view with portions broken away of a support post and portions of a cargo floor anchor system incorporating teachings of the present invention.
Figure 5C:
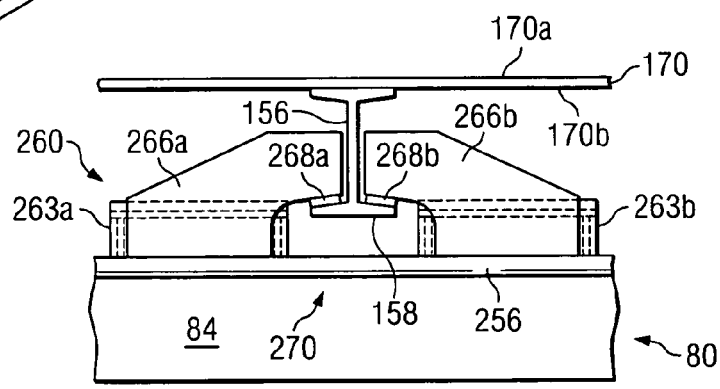
FIG. 5C is a schematic drawing showing a plan view with portions broken away of a support post and cargo floor anchor system incorporating teachings of the present invention.
Figure 6:
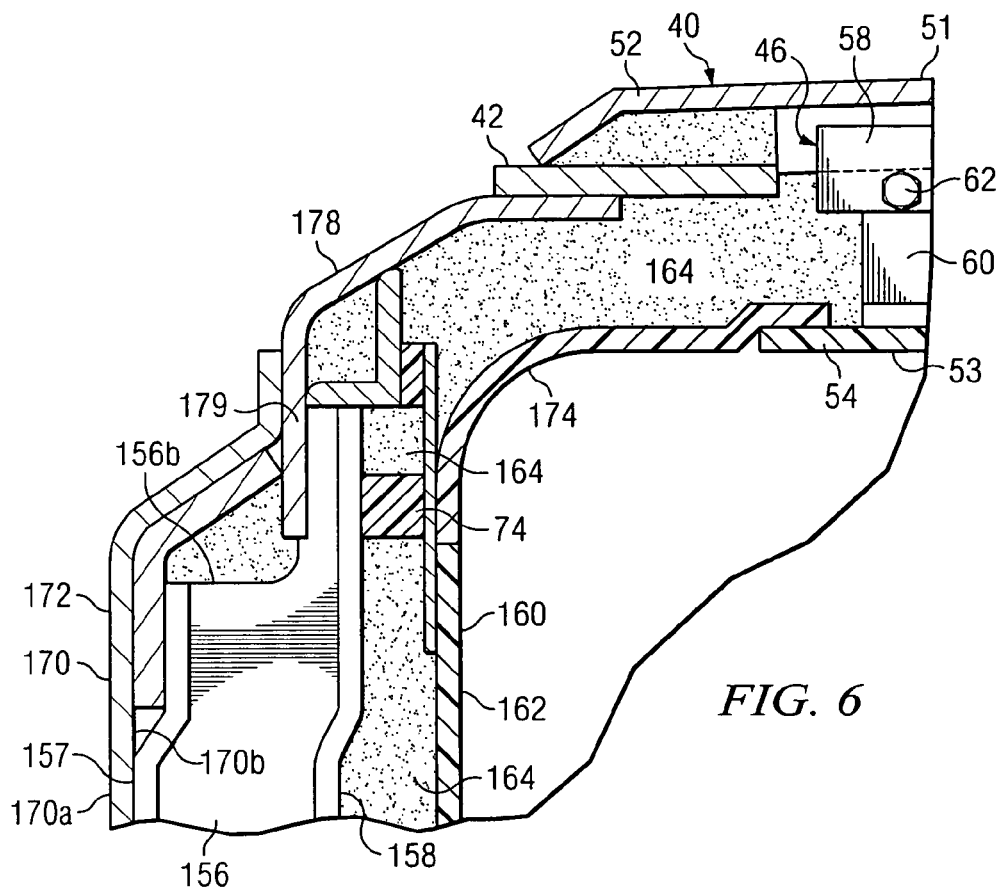
FIG. 6 is a schematic drawing in section with portions broken away showing one example of joining a roof assembly with a sidewall assembly in accordance with teachings of the present invention.
Figure 7:
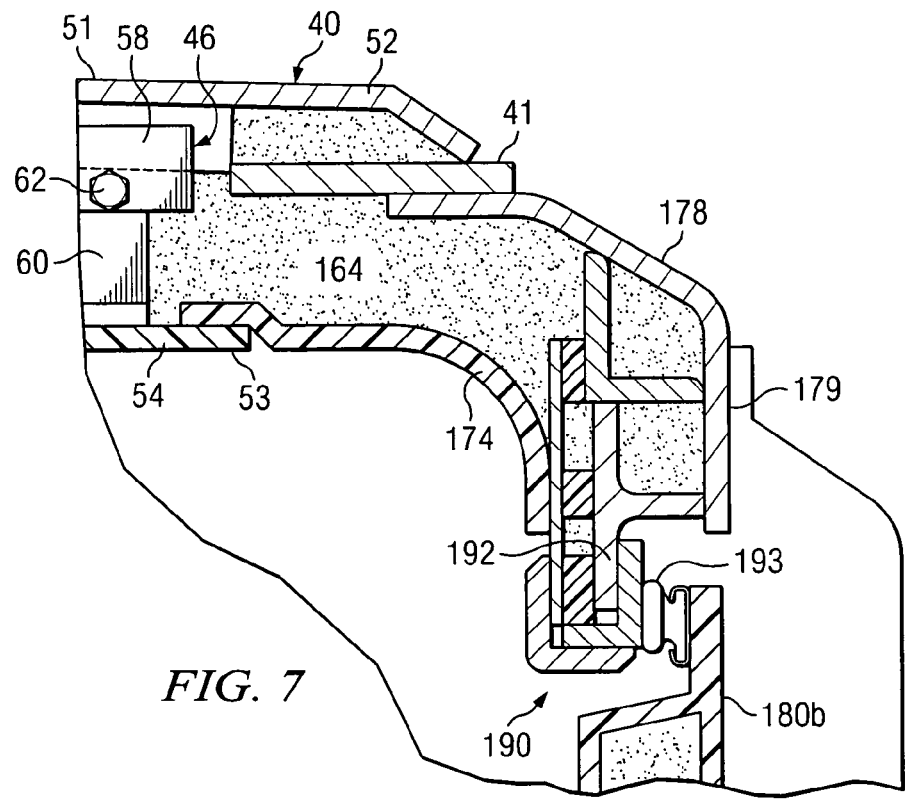
FIG. 7 is a schematic drawing in section with portions broken away showing one example of joining a roof assembly with a sidewall assembly and components of a door assembly in accordance teachings of the present invention.
Figure 8:
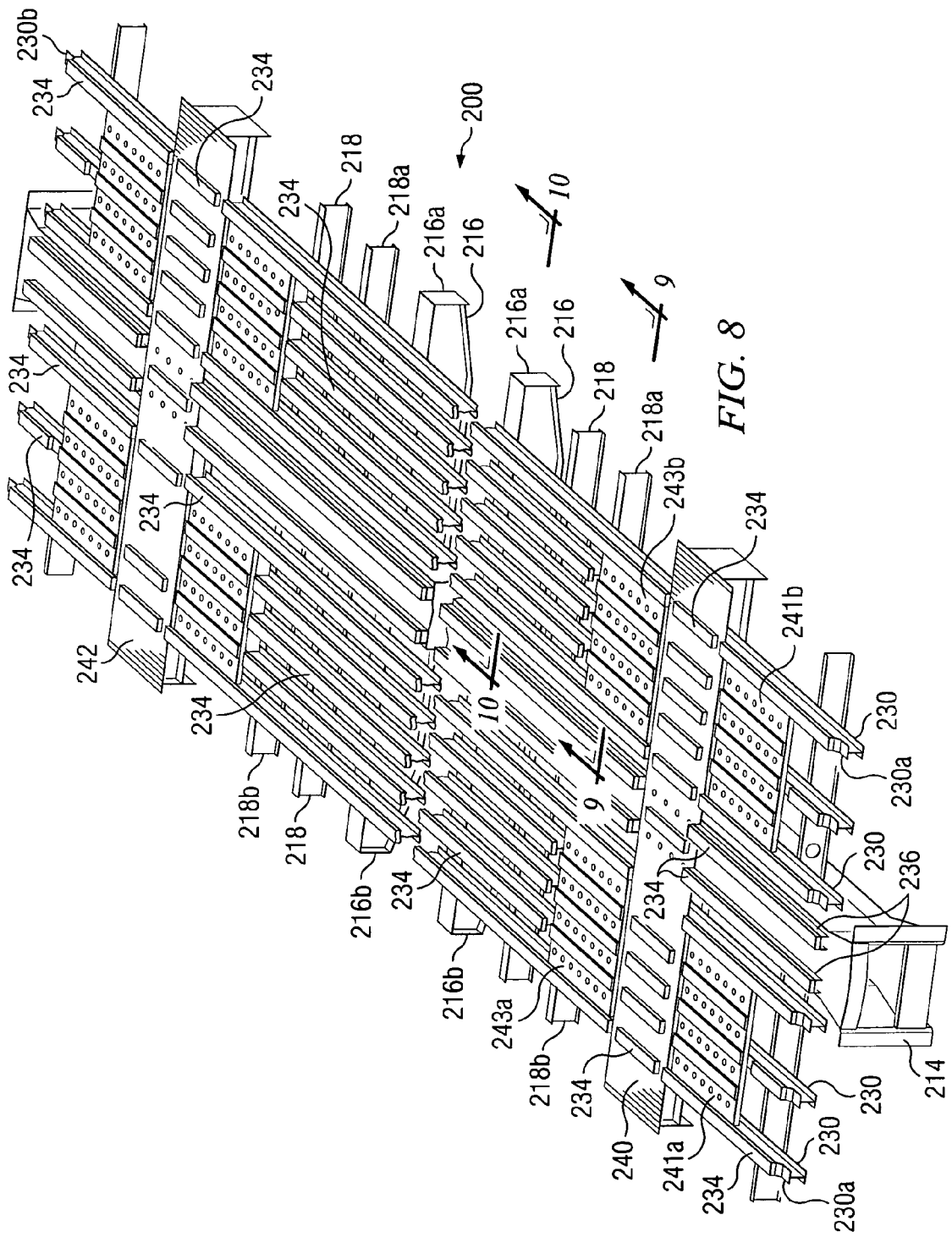
FIG. 8 is a schematic drawing showing an isometric view with portions broken away of a railway car underframe incorporating teachings of the present invention.
Figure 9:
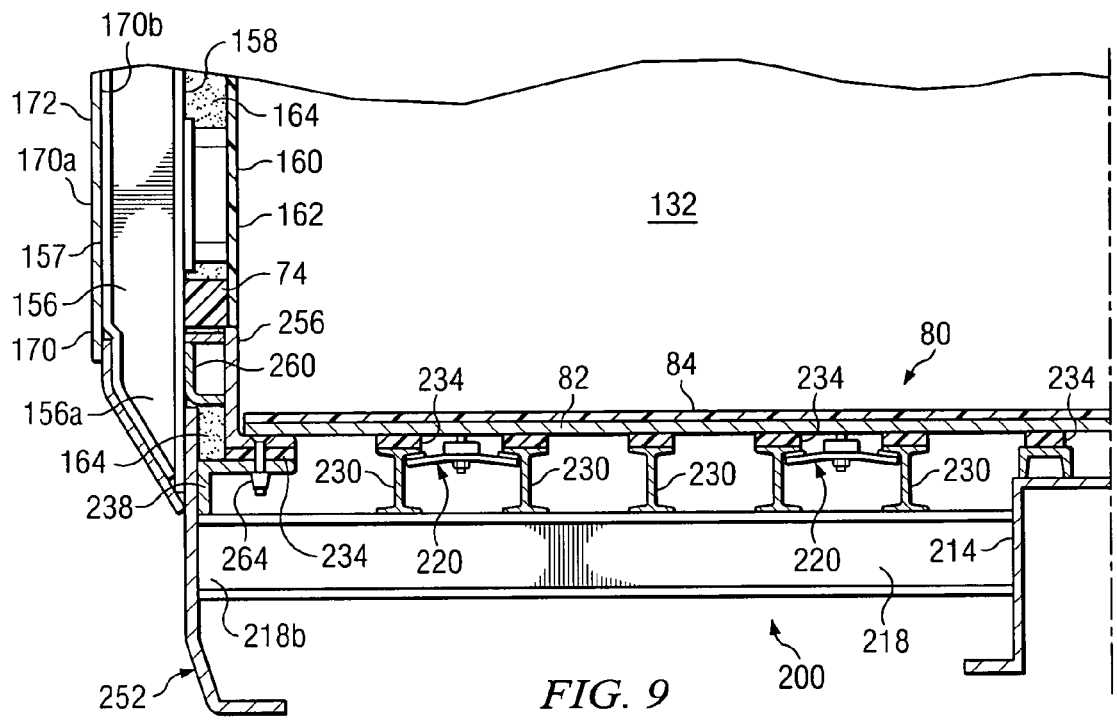
FIG. 9 is a schematic drawing in section with portions broken away showing a sidewall assembly, floor assembly and portions of a railway car underframe incorporating teachings of the present invention.
Figure 10:
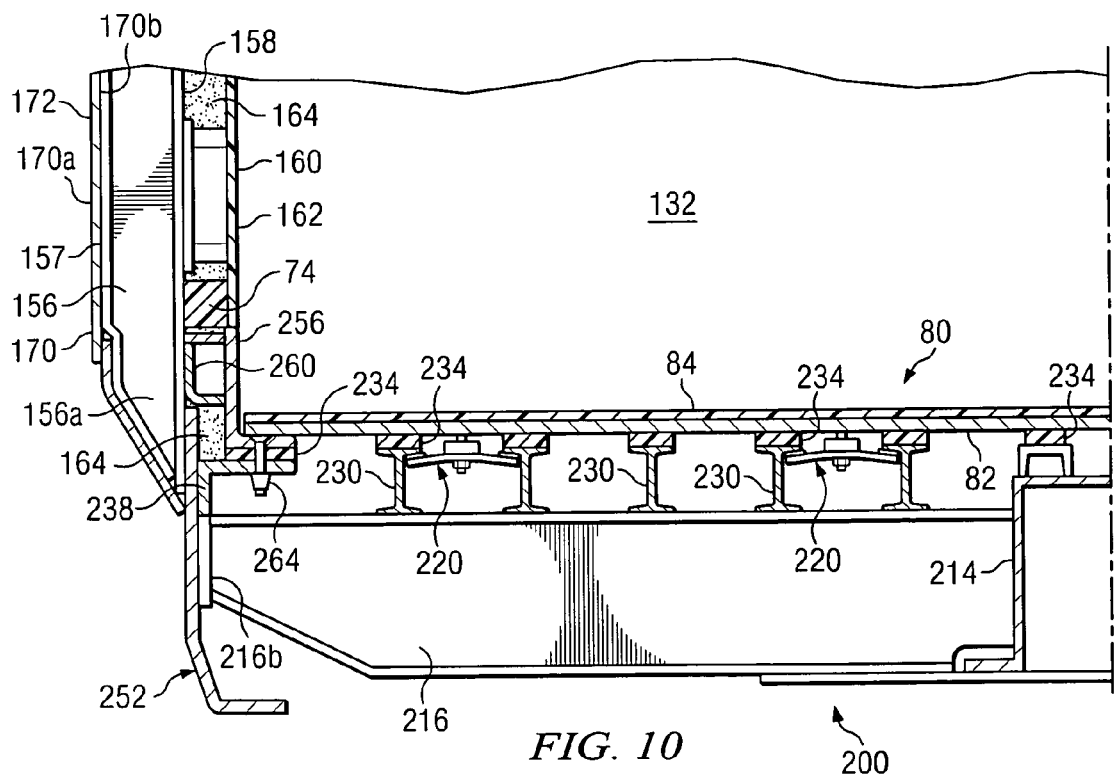
FIG. 10 is a schematic drawing in section with portions broken away showing another view of a sidewall assembly, floor assembly and railway car underframe incorporating teachings of the present invention.

Portions of floor cargo anchor system 270 are shown in FIGS. 5A and 5B disposed adjacent to the longitudinal joint formed between sidewall assembly 152 and floor assembly 80. A similar floor cargo anchor system may be disposed adjacent to the longitudinal joint formed between sidewall assembly 150 and floor assembly 80 (not expressly shown). For some applications floor cargo anchor system 270 may be designed to accommodate loads of 24,000 pounds or greater similar to conventional floor anchors for boxcars. However, floor cargo anchor system 270 eliminates many of the problems associated with cleanout of conventional floor anchors and eliminates increased heat transfer associated with conventional floor anchors.

As shown in FIGS. 5A and 5B floor cargo anchor system 270 may include cargo anchor support member or longitudinal member 256 having a plurality of openings 258 formed therein. Cargo anchor support member 256 may be generally described as an angle extending generally longitudinally along one edge of floor assembly 80. Respective isolator 234 may be disposed between cargo anchor support member 256 and adjacent angle 238.

A plurality of enclosure assemblies 260 may be attached with adjacent portions of each support post 156 and associated cargo anchor support member 256. Each enclosure assembly 260 may include first enclosure 263a and second enclosure 263b. Clips 266a and 266b may be used to couple or attach respective enclosures 263a and 263b with adjacent portions of associated support ports 156. Isolators 268a and 268b may be disposed between clips 266a and 266b and adjacent portions of associated support posts 156. Isolators 268a and 268b reduce thermal energy transfer between associated cargo anchor support member 256 and support post 156 while allowing clips 266a and 266b to provide support for respective enclosures 263a and 263b.

The perimeter of each enclosure 263a and 263b may be bonded or weld with adjacent portions of support member 256 to form a fluid tight barrier which prevents liquids for contacting insulating material 164. The bonds or welds between enclosures 263a and 263b and adjacent portions of support member 256 also provide structural strength such as the engagement between respective clips 266a and 266b and associated support posts 156 will resist bending or rotation of support members 256 when cargo loads are applied to openings 258.

Enclosures 263a and 263b have generally U-shaped, hollow configurations. During clean out of box structure 30, enclosures 263a and 263b prevent water or other fluids coming in contact with the insulating disposed between side sheets 170 and side sheets 160. Drain holes 262 may be formed in longitudinal members 256 to allow water to drain from respective enclosures 260. The location of drain holes 262 may be varied to minimize stress in associated support member 256. Cargo anchor support members 256 may include a plurality of openings 258. U.S. Pat. No. 6,494,651 entitled "Railcar Anchor and Load Snugger Arrangement" shows one example of load restraining anchor assemblies which may be releasably engaged with respective openings or holes 258 at desired locations within box structure 30.

Figure 11:
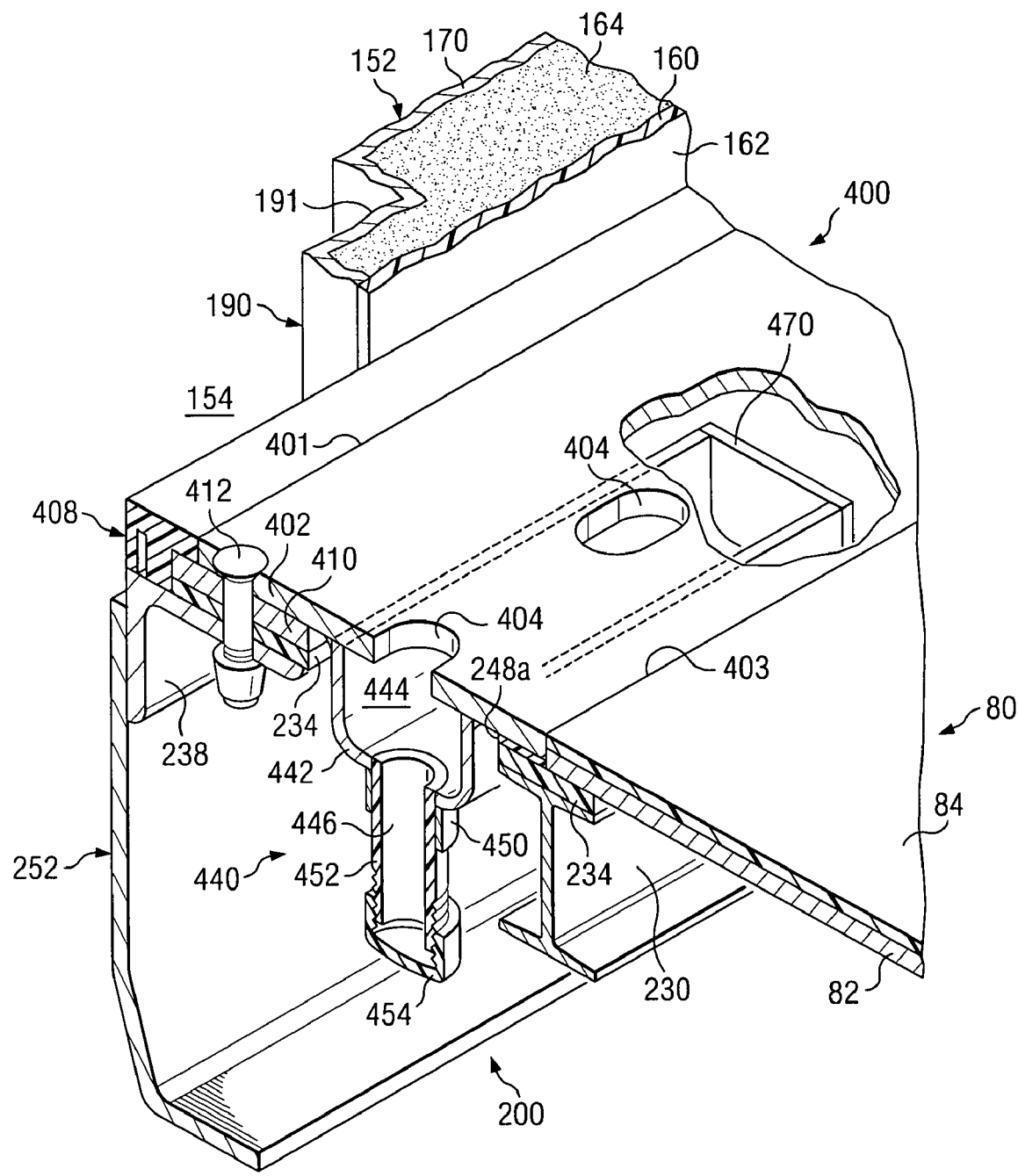
FIG. 11 is a schematic drawing in section with portions broken away showing portions of a load restraint system disposed in a floor assembly in accordance with teachings of the present invention.

For some applications, cargo anchor assemblies may be disposed within portions of a floor assembly adjacent to each enlarged opening sized to accommodate respective double side doors. FIG. 11 shows one example of floor cargo anchor system 400 which may be disposed within floor assembly 80 of insulated boxcar 20 adjacent to respective door openings 154. Floor cargo anchor system 400 preferably includes metal plate 402 disposed adjacent to respective door opening 150 formed in sidewall assembly 152. For purposes of describing various features of the present invention, portions of sidewall assembly 152 and floor assembly 80 are shown in FIG. 11 with associated door 180b in its second, open position. A similar cargo anchor system (not expressly shown) may also be disposed adjacent to door opening 154 formed in sidewall assembly 150.

For some applications, cargo anchor plate 402 may have dimensions of approximately sixteen feet (16') in length, nine and one-half inches (9½") inches in width and approximately one-half inch (½") in thickness. A plurality of openings 404 may be formed in cargo anchor plate 402 for use in securing lading adjacent to the respective openings 154. Longitudinal edge 403 of cargo anchor plate 402 may be disposed on longitudinal stringer 230 adjacent to door opening 154. Respective isolator 234 may be disposed therebetween. Anchor plate 402 may be securely engaged with angle 406 which is attached to side sill assembly 252. Threshold 408 formed from PVC or other types of composite materials may be securely attached with angle 238. For some applications, metal reinforcing plate 410 may be disposed within threshold 408. A plurality of Huck® type fasteners 412 may be used to engage cargo anchor plate 402 with threshold 408 and angle 406.

Drain system 440 may include generally U shaped channel 442 attached to and extending downwardly from cargo anchor plate 402. Channel 442 cooperates with cargo anchor plate 402 to form cargo anchor cavity 444 which communicates with openings 404. The length of channel 442 may be selected to correspond approximately with the length of cargo anchor plate 402. Respective end closures 470 may be attached to opposite ends of channel 442.

At least one opening may be formed in channel 442 to allow removal of water and other liquids from cargo anchor cavity 444. For some applications such as shown in FIG. 11, respective openings 446 may be formed proximate opposite ends of channels 442. Respective metal pipes 450 may be engaged with channels 442 proximate each opening 446. For some applications, pipes 452 formed from PVC or other types of composite materials may be disposed within and securely attached to the interior of respective pipes 450. Various techniques such as adhesive bonding may be satisfactorily used to securely engage each pipe 452 within respective pipe 450. For some applications, cap 454 may be engaged with the end of each pipe 452 opposite from cargo anchor cavity 444. For some applications, threaded connections may be used to engage cap 454 with respective pipe 452. However, a wide variety of plugs, caps and other types of closures may be satisfactorily used with a floor anchor system and drain system incorporating teachings of the present invention.

Figure 13A:
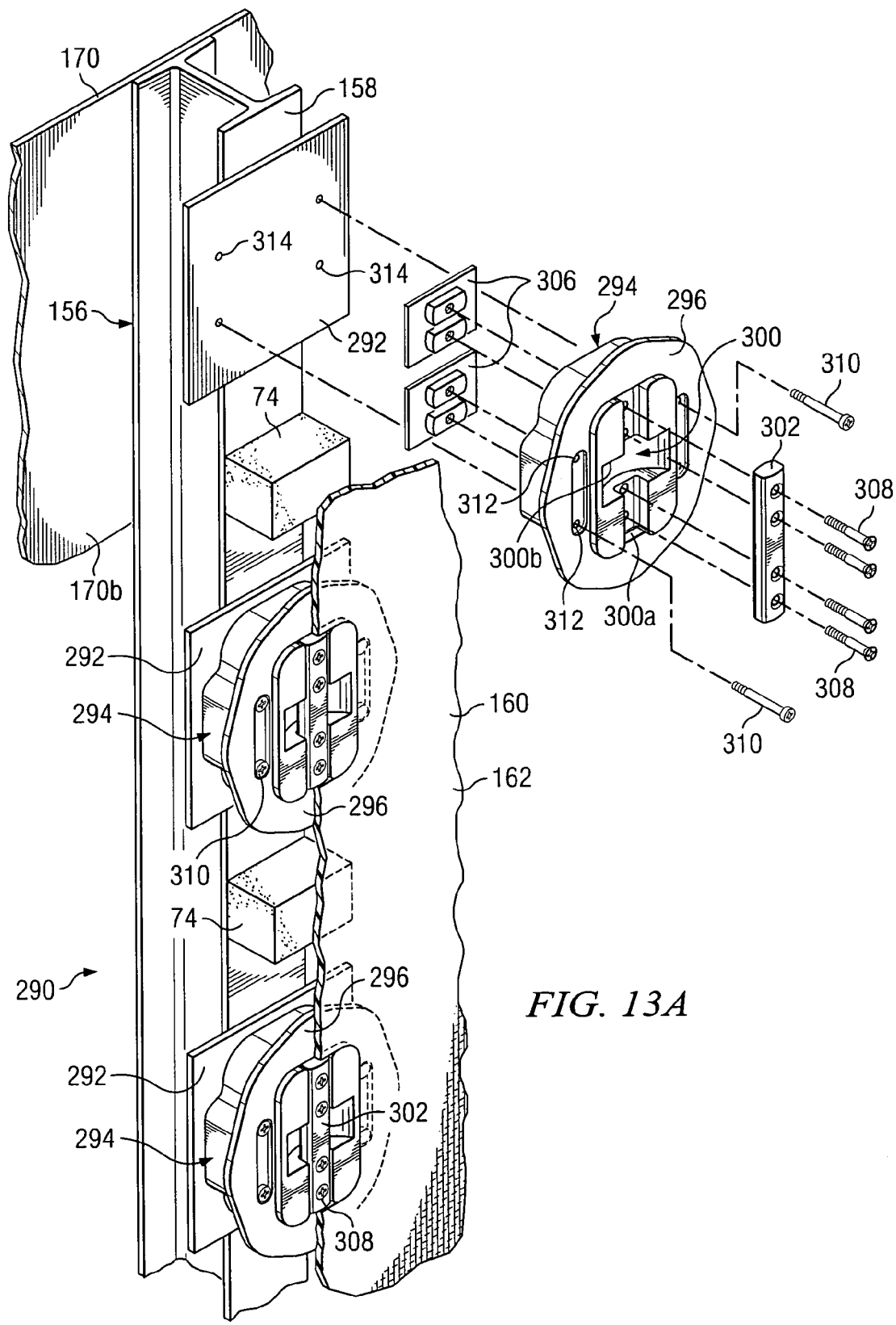
FIG. 13 is a schematic drawing showing an exploded, isometric view with portions broken away of a sidewall assembly, support post and associated components of a load restraint system incorporating teachings of the present invention.
Figures 13B, 14A:
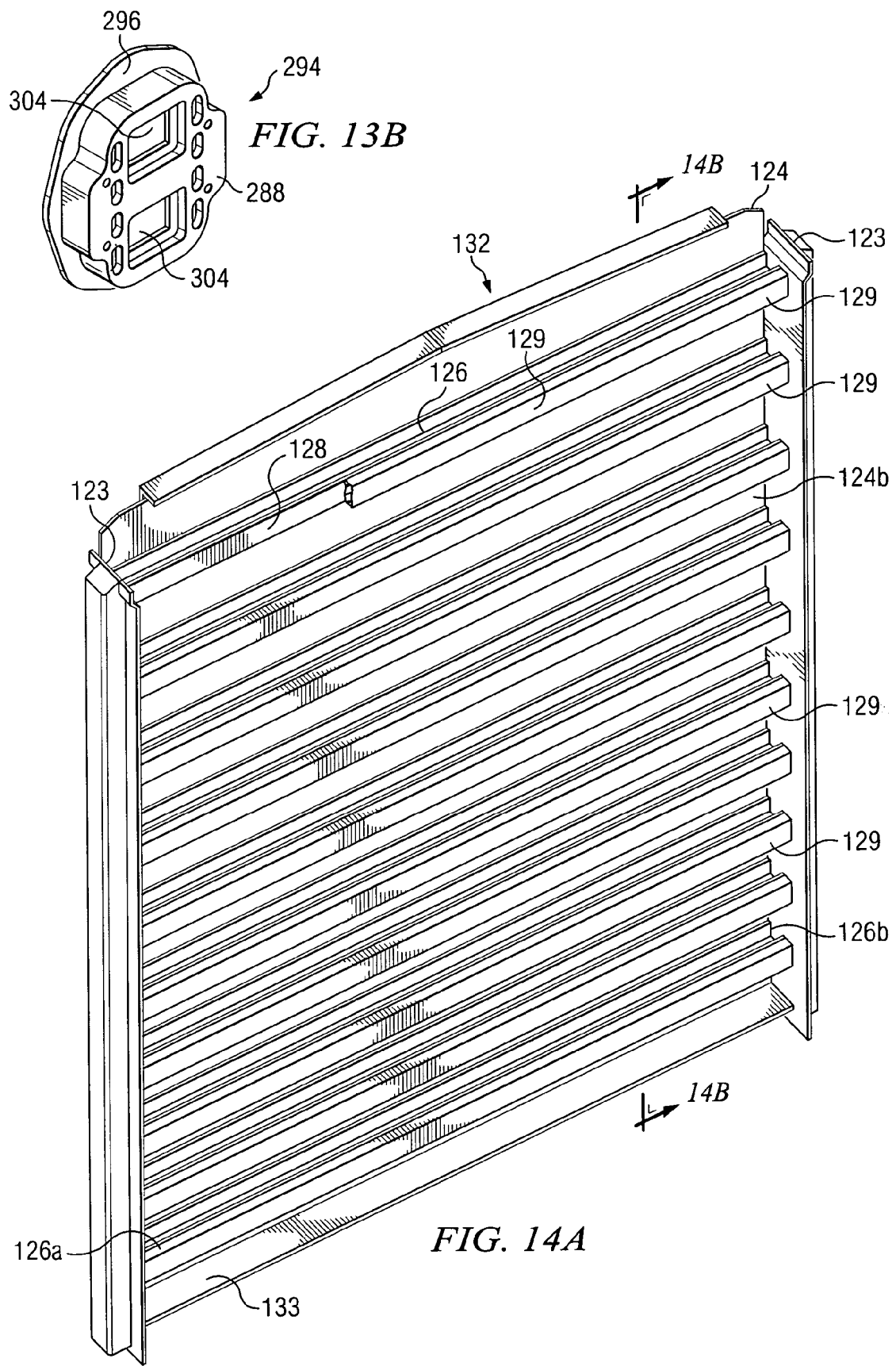
FIG. 14A is a schematic drawing showing an isometric view with portions broken away of one example of an endwall assembly incorporating teachings of the present invention.
Figure 14B:
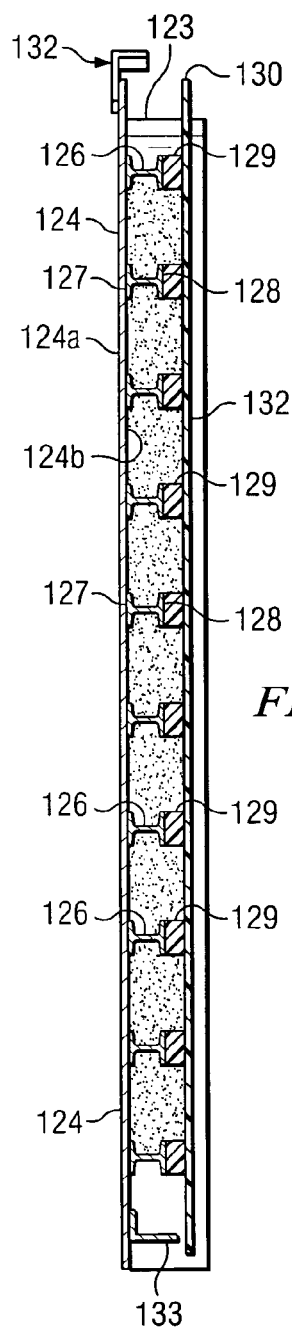
FIG. 14B is a schematic drawing in section taken along lines 14B-14B of FIG. 14A.
Figure 14C:
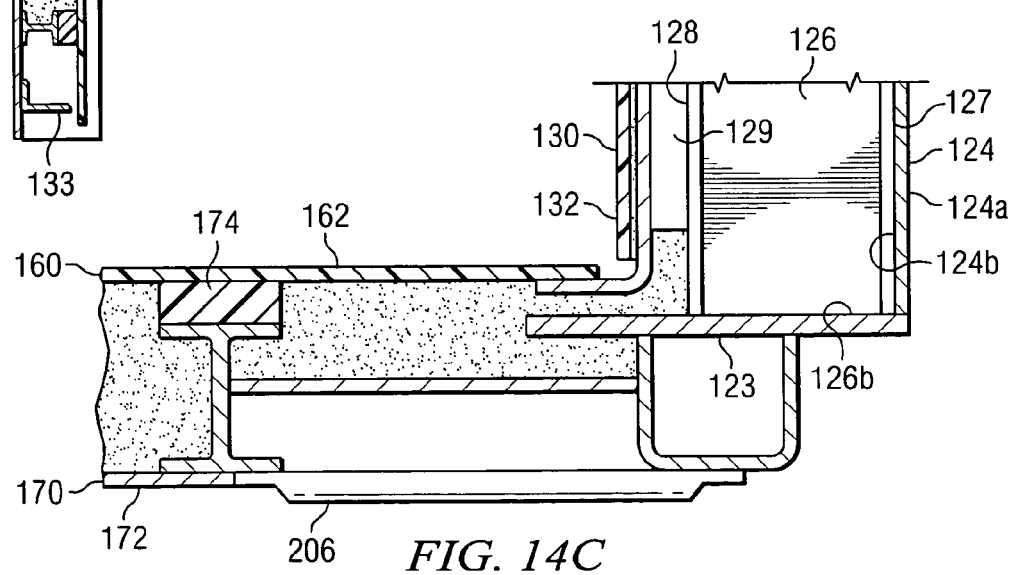
FIG. 14C is a schematic drawing in section with portions broken away showing a corner joint formed between a sidewall assembly and an endwall assembly in accordance with teachings of the present invention.

FIGS. 4A and 13 show examples of various components associated with sidewall lading anchor system 290 formed in accordance with teachings of the present invention. For some applications a total of seven sidewall lading anchors 294 may be attached with second surface 158 of selected support post 156. For some applications sidewall lading anchors 294 formed in accordance with teachings of the present invention provide comparable, if not better, load anchoring performance as compared with conventional steel sidewall lading anchors and systems while at the same time providing substantially enhanced thermal insulation capabilities. For some applications the components of sidewall anchor system 290 may support loads of approximately 15,000 pounds.

A plurality of backup plates 292 may be attached with second surface 258 of one or more support posts 156. Interior surfaces 162 of insulated boxcars 20 or 20a may be divided into quadrants defined in part by openings 154 of associated sidewall assemblies 150 and 152. Each quadrant may include four support posts 156 with respective sidewall anchor system 290 disposed thereon. Backup plate 292 may be formed from various types of materials. For some applications backup plates 292 may be formed from the same metal alloys used to form associated support post 156. Various welding techniques may be satisfactory used to attach each backup plate 292 at a desired location on second surface 158 of associated support post 156. Backup plate 292 may sometimes be formed from twelve (12) gauge carbon steel. For other applications backup plates 292 may be formed from nonmetallic materials having sufficient strength to satisfy lading anchoring requirements.

Respective sidewall lading anchor 294 may be attached with each backup plate 292. For some applications sidewall lading anchors 294 may be formed from various nonmetallic materials including, but not limited to, polycarbonate, polyvinyl chloride, fiber reinforced polyamides such as fiber reinforced nylon and any other composite material providing satisfactory structural support and heat transfer characteristics. For embodiments such as shown in FIG. 13, sidewall lading anchors 294 may be formed from polycarbonate based materials.

Each sidewall lading anchor 294 preferably includes first surface 296 and second surface 298. Recess 300 may be formed in first surface 296 of each sidewall lading anchor 294. Recess 300 may have a first portion 300a and a second portion 300b. First portion 300a may be disposed approximately perpendicular with respect to second portion 300b. Each sidewall lading anchor 294 is preferably disposed on respective backup plate 292 with first portion 300a extending generally vertically and second portion 300b extending generally horizontally relative to associated support post 156. The depth of second portion 300b is preferably greater than the depth of first portion 300a. The increased depth of second portion 300b allows banding straps or other lading restraining straps to extend around associated anchor bar 302.

A plurality of pockets may be formed in second surface 298 opposite from first surface 296. Pockets 304 may be generally aligned with and disposed opposite from recess 300. Respective plates 306 may be disposed within pockets 304.

Anchor bar 302 may be formed from various materials including stainless steel. Anchor bar 302 may also be formed with rounded or rolled edges to be compatible with associated banding straps or other lading restraining straps. The rounded edges prevent cutting of such straps.

For embodiments such as shown in FIG. 13, four openings or holes may be formed in each anchor bar 302. Corresponding holes or openings may be formed in first portion 30a of recess 300. The openings preferably extend through sidewall lading anchor 294 and exit respective pockets 304. Respective mechanical fasteners 308 may be inserted through respective openings in anchor bar 302, recess portion 300a and engaged with corresponding openings formed in plates 306. For some applications mechanical fasteners 308 may be formed from stainless steel. Corresponding portions of backup plate 306 may also be formed from stainless steel. As a result of using stainless steel anchor bars in combination with nonmetallic sidewall lading anchor 294, sidewall anchor system 290 may support loads of approximately 15,000 pounds.

After anchor bar 302 has been securely engaged with respective nonmetallic sidewall lading anchor 294, sidewall lading anchor 294 may be attached with respective backup plate 292. For some applications a second set of mechanical fasteners 310 may be inserted through additional openings 312 formed in sidewall lading anchor 294. For some applications second set of mechanical fasteners 310 may be formed from carbon, steel or other suitable alloys. Corresponding holes 314 may be formed in respective backup plates 292 to receive second set of mechanical fasteners 310.

For other applications various types of adhesive bonding materials may be satisfactorily used to securely engage second surface 298 with respective backup plate 292. Examples of such adhesives may include, but are not limited to, methyl methacrylate available as ITW Plexus MA 420. For some applications foam blocks or isolators 74 may be attached with second surface 158 between adjacent sidewall lading anchors 294. For some applications isolators (non expressly shown) may also be disposed between backup plates 292 and respective sidewall lading anchors 294.

To prevent undesired movement of floor assembly 80 relative to railway car underframe 200, a plurality of floor restraint assemblies 220 may be used to engage portions of floor assembly 80 with adjacent longitudinal stringers 230. See FIGS. 4A, 4B, 5, 9 and 10. For embodiments of the present invention as represented by insulated boxcars 20 and 20a, floor restraint assembly 220 may include connector plate 222 extending between two adjacent longitudinal stringers 230. See FIG. 4B. For some applications connector plate 222 may have a generally rectangular configuration with a length corresponding approximately with the distance between two adjacent longitudinal stringers 230 and a width of three or four inches. Isolators 224 may be disposed between the each end of connector plate 222 and adjacent portions of respective longitudinal stringers 230. Isolators 224 may be formed from the same type of material as isolators 234.

Various types of mechanical fasteners may be used to attach with metal plate 82 in between associated longitudinal stringers 230. For some applications, threaded stud or bolt 226 may be used. Various welding techniques may be used to attach studs 226 with metal plates 82.

First opening 227 may be formed at approximately the center of connector plate 222 and sized to receive mechanical fastener 226. For some applications backup plate 223 may be attached with connector plate 222 at approximately the center of connector plate 222. Second opening 225 may be formed in backup plate 223 aligned with first opening 227. Mechanical fastener 226 preferably extends through both openings 225 and 227. For embodiments such as shown in FIG. 4B, washer 228 and nut 229 may be used to securely engage connector plate 222 with adjacent portions of longitudinal stringers 230 and floor assembly 80.

The dimensions of backup plate 223 are preferably selected such that a gap will be formed between backup plate 223 and adjacent portions of floor plate 82. Backup plate 223 may be used to prevent or limit undesired bending of connector plate 222 during tightening of nut 229 on mechanical fastener 226. The location of floor restraint assemblies 220 may be selected to minimize undesired movement of floor assembly 80 during loading and unloading of boxcars 20 and 20a. For example, two or more floor restraint assemblies 220 may be disposed adjacent to each door opening 154 and two or more floor restraints may be disposed adjacent to center sill 214.

Roof assembly 40 may have a generally elongated, rectangular configuration. The length and width of roof assembly 40 corresponds generally with the desired length and width of box structure 30. Roof assembly 40 includes first longitudinal edge 41 and second longitudinal edge 42 spaced from each other and extending generally parallel with each other from first lateral edge 43 to second lateral edge 44. First longitudinal edge 41 and second longitudinal edge 42 are preferably mounted on and attached with adjacent portions of respective sidewall assemblies 150 and 152. See FIGS. 5 and 6. Lateral edges 43 and 44 are preferably mounted on and attached with respective endwall assemblies 120 and 122.

For some applications roof assembly 40 may include exterior surface 51 formed from a plurality of roof sheets 52. Various materials such as steel alloys, aluminum alloys and/or composite materials may be used to form roof sheets 52. Interior surface 53 may be formed from multiple layers of fiber reinforced plastic 54 or other suitable composite materials. Various types of composite materials and/or insulating materials may be satisfactory used to form portions of roof assembly 40.

Roof assembly 40 preferably includes a plurality of roof support or transverse splines 46 which may be attached to and extend laterally between top chords 178 (upper portions of associated sidewall assemblies 150 and 152). See FIGS. 4A and 15. The length of each roof support or transverse spline 46 may be approximately equal to the width of composite box structure 30. Each roof support 46 preferably includes generally C-shaped channel 48. For embodiments such as shown in FIG. 15 generally C-shaped channel 48 may be formed from two components, channels 48a and 48b. First generally C-shaped channel 48a may be joined with second generally C-shaped channel 48b at approximately the longitudinal center line of roof assembly 40. The respective ends of C-shaped channels 48a and 48b may be joined with each other at an angle to provide desired slope for roof sheets 51. For some applications the angle may vary from approximately zero degrees to two degrees or greater. For one application the angle may produce a roof pitch of 0.55 degrees or a one-half inch rise over nine feet. Channels 48a and 48b may be formed from various types of metal alloy such as aluminum alloys or steel alloys satisfactory for use in manufacturing a railway car. A plurality of roof sheets 52 may be attached with and extend between adjacent roof supports 46.

Support assembly 56 may be attached with one leg of C-shaped channels 48a and 48b. See FIGS. 15 and 16. Support assembly 56 may be manufactured from various types of materials including steel or aluminum alloys and fiber reinforced plastic materials. For embodiments such as shown in FIGS. 15 and 16 each support assembly 56 may include metal plate 58 which may be welded with adjacent portions of channels 48a and 48b. See welds 57. Each support assembly 56 may also include a generally T-shaped connector 60. For some applications T-shaped connector 60 may be formed from fiber reinforced plastic materials using pultrusion techniques. T-shaped connector 60 may be attached with respective metal plate 58 using a plurality of mechanical fasteners such as bolts 62 and nuts 63. However, T-shaped connector 60 may be coupled with respective metal plate 58 using other types of mechanical fasteners and/or adhesive bonding techniques. Fiber reinforced plastic layers 54 may be bonded with generally T-shaped connectors 60 opposite from channels 48a and 48b.

Top plate 132 of endwall assemblies 120 and 122 may also be formed at an angle corresponding with roof support or splines 46. See FIGS. 14a and 14b. Respective roof sheets 52 may be bonded with top plates 132 and adjacent roof supports or transverse splines 46.

One example of a universal boxcar formed in accordance with teachings of the present invention may have the following features:

286,000 lb. Gross Rail Load;
Standard car equipped with two 8'-0" wide by 12'-4" high insulated plug doors;
Optional 15" end-of-car cushioning unit;
Meets AAR Plate "F" Clearance Diagram;
Optional wireless monitoring system;
Metallic exterior surfaces;
Conventional urethane foam insulation; and
Durable, wood free interior surfaces.

| | |
|---|---|
| Length Inside | 60'-9" |
| Length Over Coupler Pulling Faces | 69'-¾" |
| Length over Strikers | 64'-8¾" |
| Length Between Truck Centers | 46'-3" |
| Truck Wheel Base | 5'-10" |
| Width, Extreme | 10'-6⅝" |
| Width, Inside | 9'-6" |
| Height, Extreme | 16"-11⅞" |
| Height Inside at Center Line of Car | 12'-10½" |
| Gross Rail Load | 286,000 lbs. |
| Estimated Lightweight | 95,000 lbs. |
| Estimated Load Limit (Gross Rail Load-Lightweight) | 191,000 lbs. |
| Cubic Capacity (Between bulkheads) | 7,442 cubic feet |
| Cubic Capacity (Level with height of sides) | 7,442 cubic feet |

Although the present invention and its advantages have been described in detail, it should be understood that various changes, substitutions and alternations can be made herein without departing from the spirit and scope of the invention as defined by the following claims.

What is claimed is:

1. An insulated boxcar comprising:
    a pair of sidewall assemblies mounted on a railway car underframe;
    each sidewall assembly having an interior surface formed by sheets of composite material and an exterior surface formed by metal sheets;
    insulating material disposed between and bonded with the sheets of composite material and the metal sheets;
    each sidewall assembly having a plurality of support posts;
    each support post having a first end and a second end;
    the first end of each support post attached to a respective side sill assembly;
    the first end of each support post having a swedged portion to accommodate attachment with the respective side sill assembly;
    each support post having a first surface and a second surface;
    the metal sheets attached to respective second surfaces of the support posts;
    nonmetallic isolators attached to respective first surfaces of the support posts opposite from the attached metal sheets;
    the sheets of composite material attached with the nonmetallic isolators;
    the swedged portions of the support posts cooperating with the respective side sill assembly to allow exterior dimensions of the box structure to satisfy clearance requirements based on a nominal length of sixty feet for the insulated boxcar;
    interior dimensions of the boxcar, inside width approximately nine feet six inches and inside height at center line twelve feet ten and one half inches corresponding approximately with interior dimensions of an uninsulated boxcar having the same nominal length of sixty feet and exterior extreme height up to sixteen feet eleven and seven eighths inches and an extreme width of approximately ten feet six and five eighths inches; and
    the insulated boxcar having a UA factor rating less than 300 BTU/° F./hour.

2. The insulated boxcar of claim 1 further comprising the nonmetallic isolators formed in part from materials selected from the group consisting of polyvinyl chloride, polycarbonate and other plastic polymers operable to improve heat transfer rating of the insulated boxcar.

3. The insulated boxcar of claim 1 further comprising the sheets of composite material satisfactory for carrying lading selected from the group consisting of coiled steel, coiled aluminum sheets, lumber, beer, wine, newsprint, paper rolls, automobile parts, household goods, canned food products, packaged perishable food products and packaged nonperishable food products.

4. The insulated boxcar of claim 1 further comprising:
the metal sheets selected from the group consisting of steel alloys and aluminum alloys; and
the support posts selected from the group consisting of steel alloys, aluminum alloys and composite materials.

5. A railway car comprising:
a box structure defined in part by a pair of sidewall assemblies, a pair of endwall assemblies, a floor assembly and a roof assembly;
the floor assembly mounted on a railway car underframe;
the sidewall assemblies mounted on the railway car underframe adjacent to opposite sides of the floor assembly;
a respective longitudinal joint formed between each sidewall assembly and adjacent portions of the floor assembly;
each sidewall assembly having exterior side sheets and interior side sheets with insulating material disposed therebetween;
a plurality of support posts disposed between the exterior side sheets and the interior side sheets of each sidewall assembly;
at least one lading anchor formed at least in part from nonmetallic material attached to at least one support post;
each nonmetallic sidewall lading anchor having a first surface and a second surface;
a recess formed in the first surface and sized to receive an anchor bar;
a plurality of pockets formed in the second surface opposite from the recess in the first surface;
respective plates disposed within selected pocket formed in the second surface of the nonmetallic sidewall lading anchor;
the anchor bar disposed within the recess in the first surface;
a plurality of openings extending through the anchor bar, the recess in the first surface, adjacent portions of the nonmetallic sidewall lading anchor and the plates; and
a respective first mechanical fastener extending through the openings and engaged with one of the plates to securely hold the anchor bar in the recess.

6. The railway car of claim 5 further comprising the anchor bar formed from stainless steel.

7. The railway car of claim 5 further comprising the first mechanical fasteners formed from stainless steel.

8. The railway car of claim 5 further comprising a plurality of second mechanical fasteners extending through each nonmetallic sidewall lading anchor and the respective backup plates.

9. The railway car of claim 8 further comprising the second mechanical fasteners formed from carbon steel.

10. A railway car comprising:
a box structure defined in part by a pair of sidewall assemblies, a pair of endwall assemblies, a floor assembly and a roof assembly;
the floor assembly mounted on a railway car underframe;
the sidewall assemblies mounted on the railway car underframe adjacent to opposite sides of the floor assembly;
a respective longitudinal joint formed between each sidewall assembly and adjacent portions of the floor assembly;
each sidewall assembly having exterior side sheets and interior side sheets with insulating material disposed therebetween;
a plurality of support posts disposed between the exterior side sheets and the interior side sheets of each sidewall assembly;
at least one nonmetallic sidewall lading anchor formed at least in part with a nonmetallic backup plate attached to at least one support post;
each nonmetallic backup plate formed at least in part from material selected from the group consisting of polycarbonate material, polyvinyl chloride material, and fiber reinforced polyamides;
each nonmetallic backup plate attached with one of the support posts opposite from the exterior side sheets; and
respective nonmetallic sidewall lading anchors engaged with and securely attached to each backup plate.

11. The railway car of claim 10 further comprising a nonmetallic isolator disposed between each backup plate and the respective nonmetallic sidewall lading anchor.

12. A railway car comprising:
a box structure defined in part by a pair of sidewall assemblies, a pair of endwall assemblies, a floor assembly and a roof assembly;
the floor assembly mounted on a railway car underframe;
the sidewall assemblies mounted on the railway car underframe adjacent to opposite sides of the floor assembly;
a respective longitudinal joint formed between each sidewall assembly and adjacent portions of the floor assembly;
each sidewall assembly having exterior side sheets and interior side sheets with insulating material disposed therebetween;
a plurality of support posts disposed between the exterior side sheets and the interior side sheets of each sidewall assembly;
at least one sidewall lading anchor formed at least in part from nonmetallic material attached to at least one support post;
a plurality of backup plates attached with at least one of the support posts opposite from the exterior side sheets; and
an adhesive layer used to attach each sidewall lading anchor with the respective backup plate.

13. A railway car comprising:
a box structure defined in part by a pair of sidewall assemblies, a pair of endwall assemblies, a floor assembly and a roof assembly;
the floor assembly mounted on a railway car underframe;
the sidewall assemblies mounted on the railway car underframe adjacent to opposite sides of the floor assembly;
a respective longitudinal joint formed between each sidewall assembly and adjacent portions of the floor assembly;
each sidewall assembly having exterior side sheets and interior side sheets with insulating material disposed therebetween;
a plurality of support posts disposed between the exterior side sheets and the interior side sheets of each sidewall assembly;
each support post having an I beam cross section;
a plurality of backup plates attached to the first surface of selected support posts;
respective nonmetallic isolators attached to the backup plates opposite from the selected support ports; and
respective nonmetallic sidewall lading anchors attached to each backup plate with one of the nonmetallic isolators disposed therebetween.

* * * * *